(12) United States Patent
Maeno

(10) Patent No.: US 8,379,245 B2
(45) Date of Patent: Feb. 19, 2013

(54) SYSTEM FOR MANAGING FLEXIBLE COPYING WITH INFORMATION LEAKAGE PREVENTED AND/OR DETECTED

(75) Inventor: Kurato Maeno, Saitama (JP)

(73) Assignee: Oki Data Corporation, Tokyo (JP)

(*) Notice: Subject to any disclaimer, the term of this patent is extended or adjusted under 35 U.S.C. 154(b) by 1312 days.

(21) Appl. No.: 12/010,606

(22) Filed: Jan. 28, 2008

(65) Prior Publication Data

US 2008/0180753 A1    Jul. 31, 2008

(30) Foreign Application Priority Data

Jan. 30, 2007    (JP) .................................. 2007-19728

(51) Int. Cl.
   *G06K 9/00*    (2006.01)
   *G06K 15/00*   (2006.01)
(52) U.S. Cl. .................. 358/1.15; 358/1.14; 358/1.18; 382/100; 382/195
(58) Field of Classification Search .............. 358/3.28, 358/1.14, 1.15, 1.9, 1.13, 1.18, 5.37, 5.38; 382/100, 195
   See application file for complete search history.

(56) References Cited

U.S. PATENT DOCUMENTS

| | | | |
|---|---|---|---|
| 6,738,491 B1 * | 5/2004 | Ikenoue et al. ............... | 382/100 |
| 7,174,567 B2 | 2/2007 | Keramane | |
| 2003/0021442 A1 * | 1/2003 | Suzaki .......................... | 382/100 |
| 2005/0275866 A1 * | 12/2005 | Corlett ......................... | 358/1.14 |
| 2006/0109506 A1 * | 5/2006 | Horiuchi et al. ............. | 358/1.15 |
| 2006/0216087 A1 * | 9/2006 | Yamaguchi et al. .......... | 399/366 |
| 2007/0196133 A1 * | 8/2007 | Kubo ............................ | 399/223 |

FOREIGN PATENT DOCUMENTS

| | | |
|---|---|---|
| CN | 1778100 A | 5/2006 |
| JP | 02-111161 | 4/1990 |
| JP | 2003-067249 A | 3/2003 |
| JP | 2003-101762 | 4/2003 |
| JP | 2003-283797 A | 10/2003 |
| JP | 2004-260341 | 9/2004 |
| JP | 2005-176239 A | 6/2005 |
| JP | 2005-265902 A | 9/2005 |
| JP | 2005-333359 | 12/2005 |
| JP | 2006-502495 A | 1/2006 |
| JP | 2006-100917 A | 4/2006 |
| JP | 2006-295858 A | 10/2006 |

* cited by examiner

*Primary Examiner* — King Poon
*Assistant Examiner* — Allen H Nguyen
(74) *Attorney, Agent, or Firm* — Rabin & Berdo, P.C.

(57) ABSTRACT

In a copy management system, an output device generates a print image, and list information including identification information identifying a person authorized for printing. The list information is converted to a specific code, which is in turn embedded in a print image. The code-embedded print image is output by a printer on a printing medium. The code-embedded print image on the printing medium is received by a copying device of the system. The copying device also receives and accepts copier identification information identifying a copying person. The list information is acquired from the code-embedded print image. The identification information in the list information acquired is compared to the copier identification information accepted. Allowance/non-allowance of copying is determined based on whether or not the above information coincides with each other. The copying device outputs a printed copy subject to decision for allowance of copying.

7 Claims, 16 Drawing Sheets

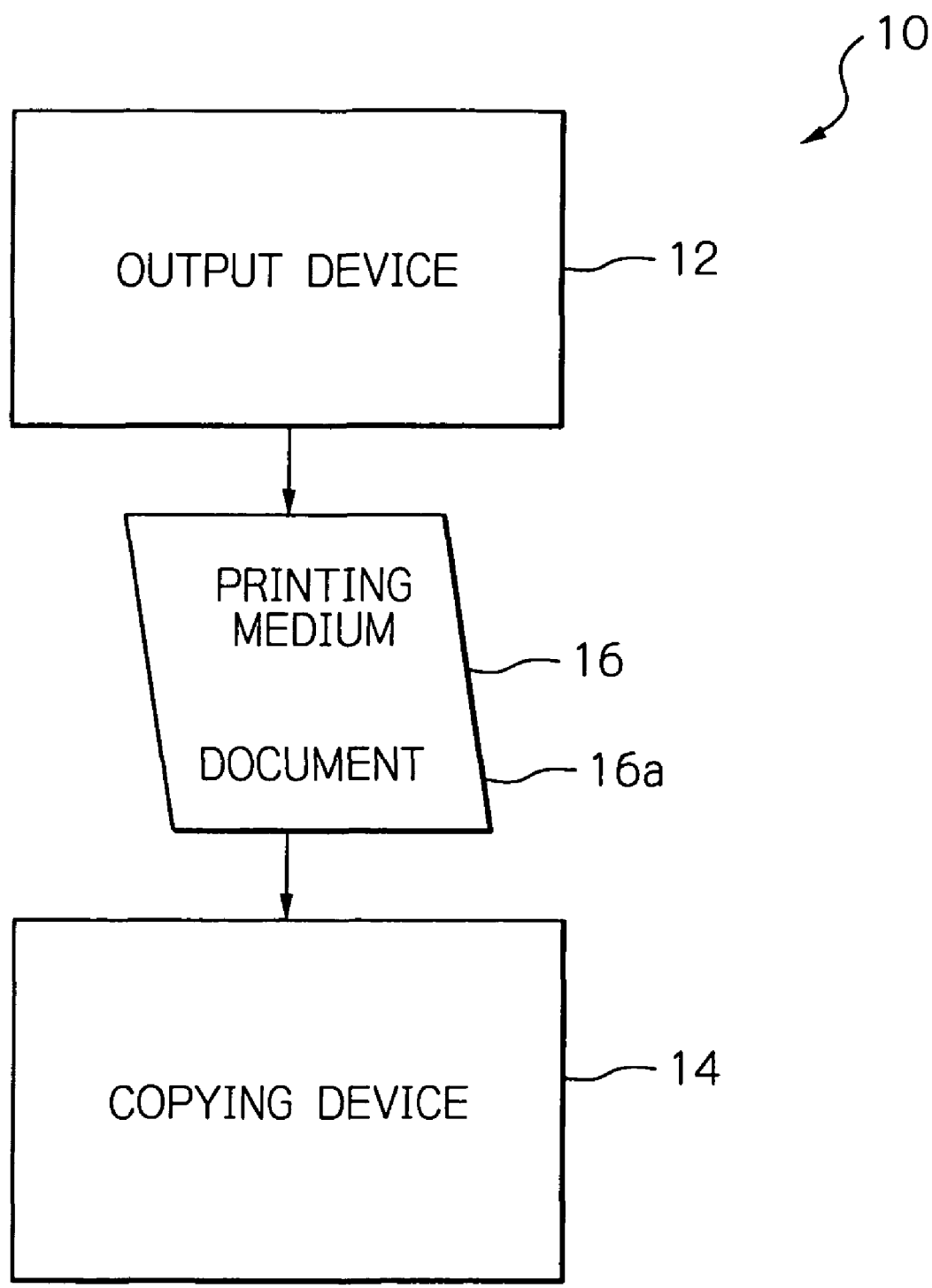

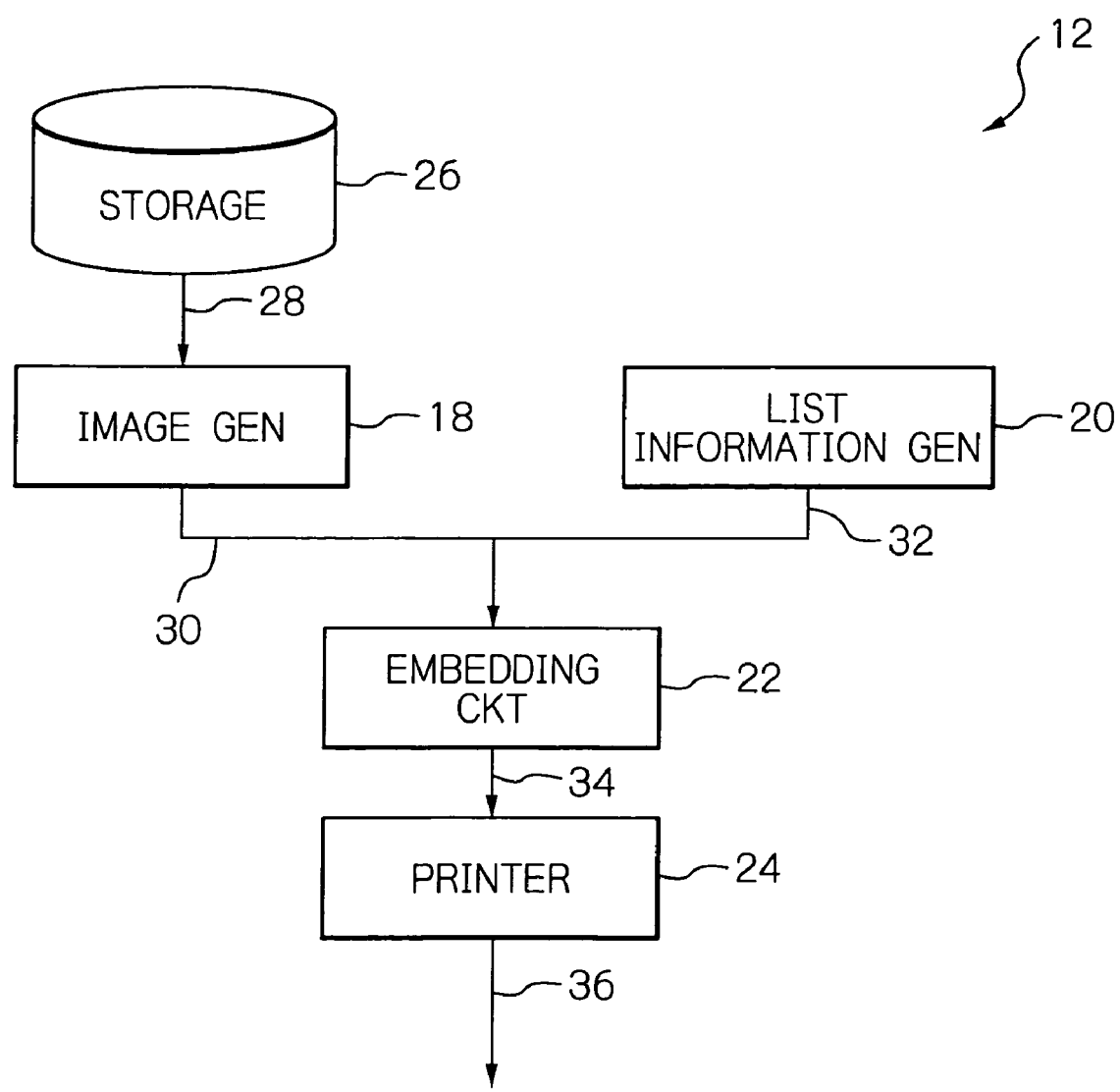

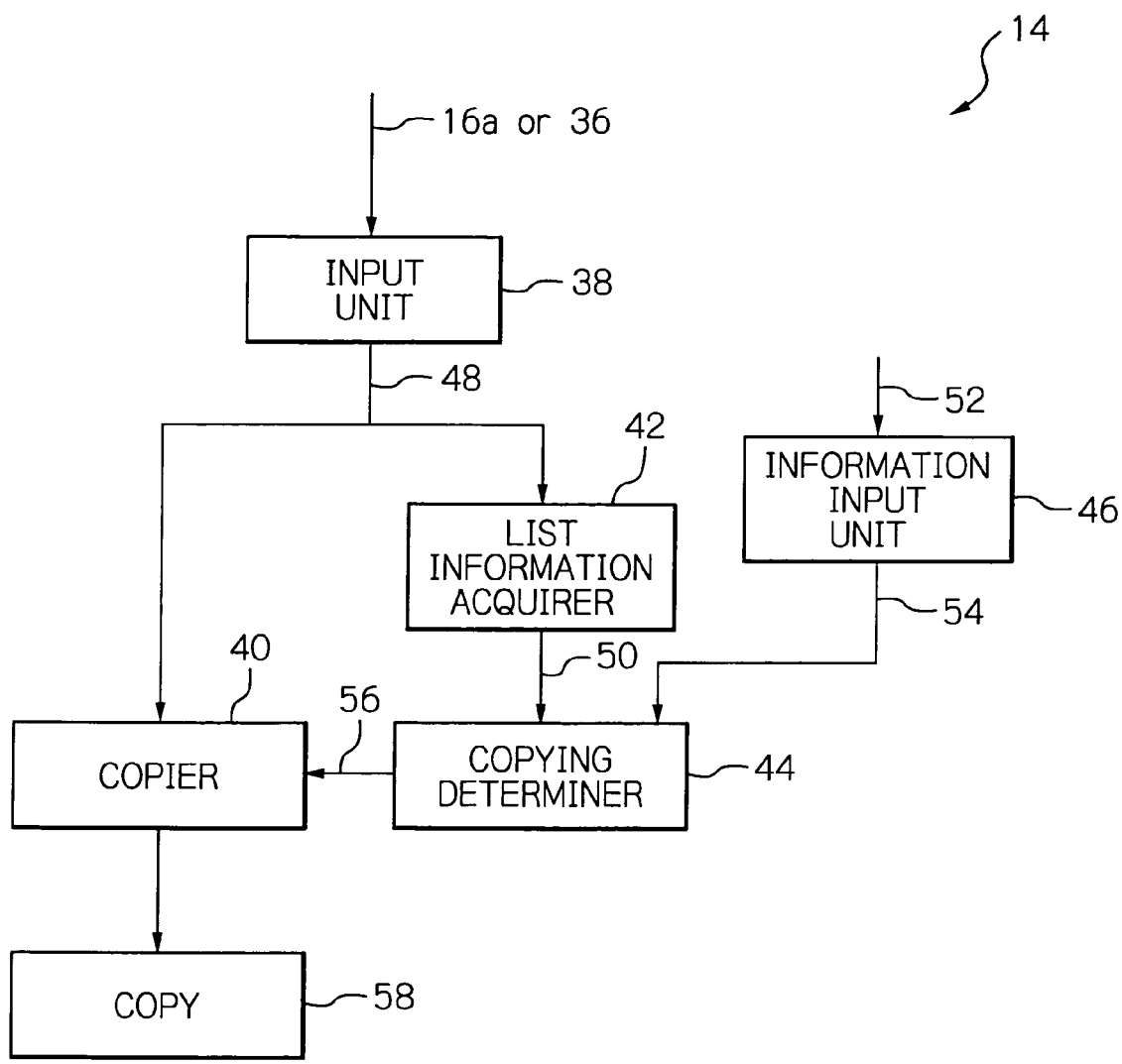

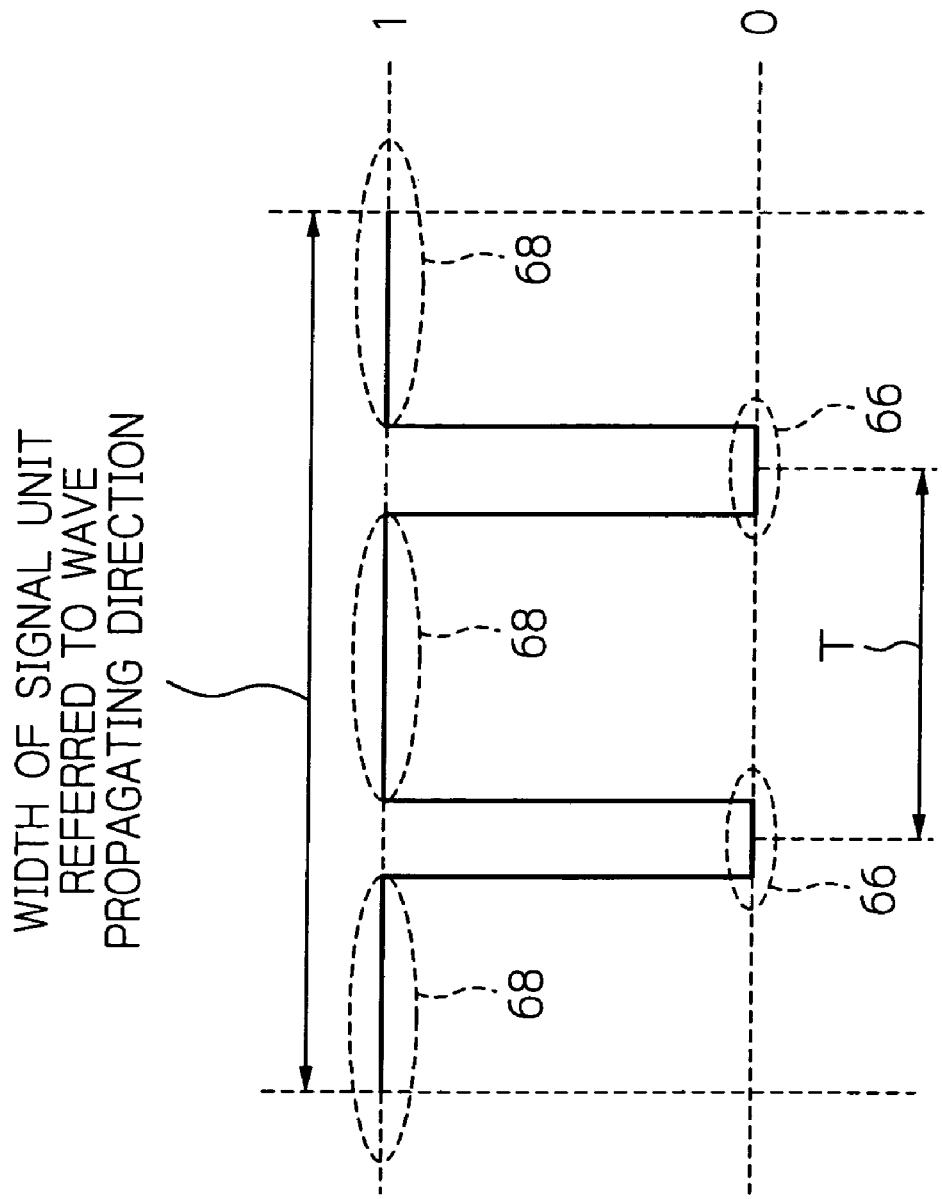

UNIT E

UNIT A

UNIT B

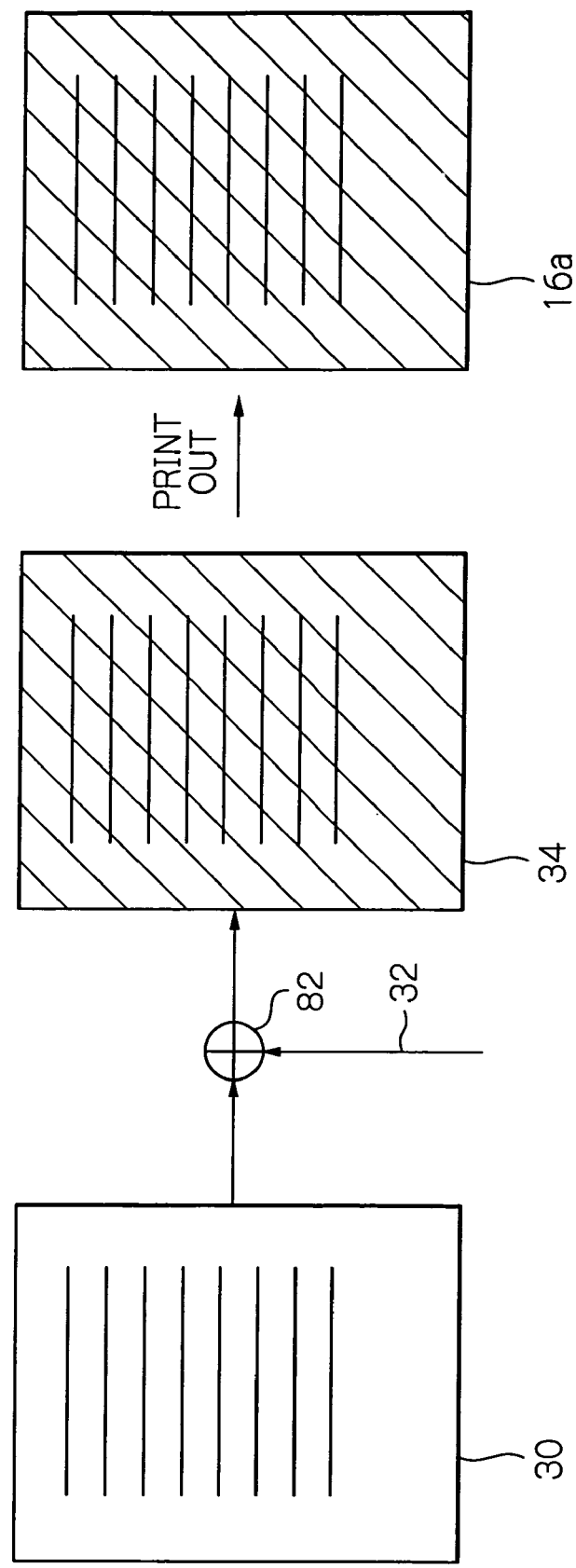

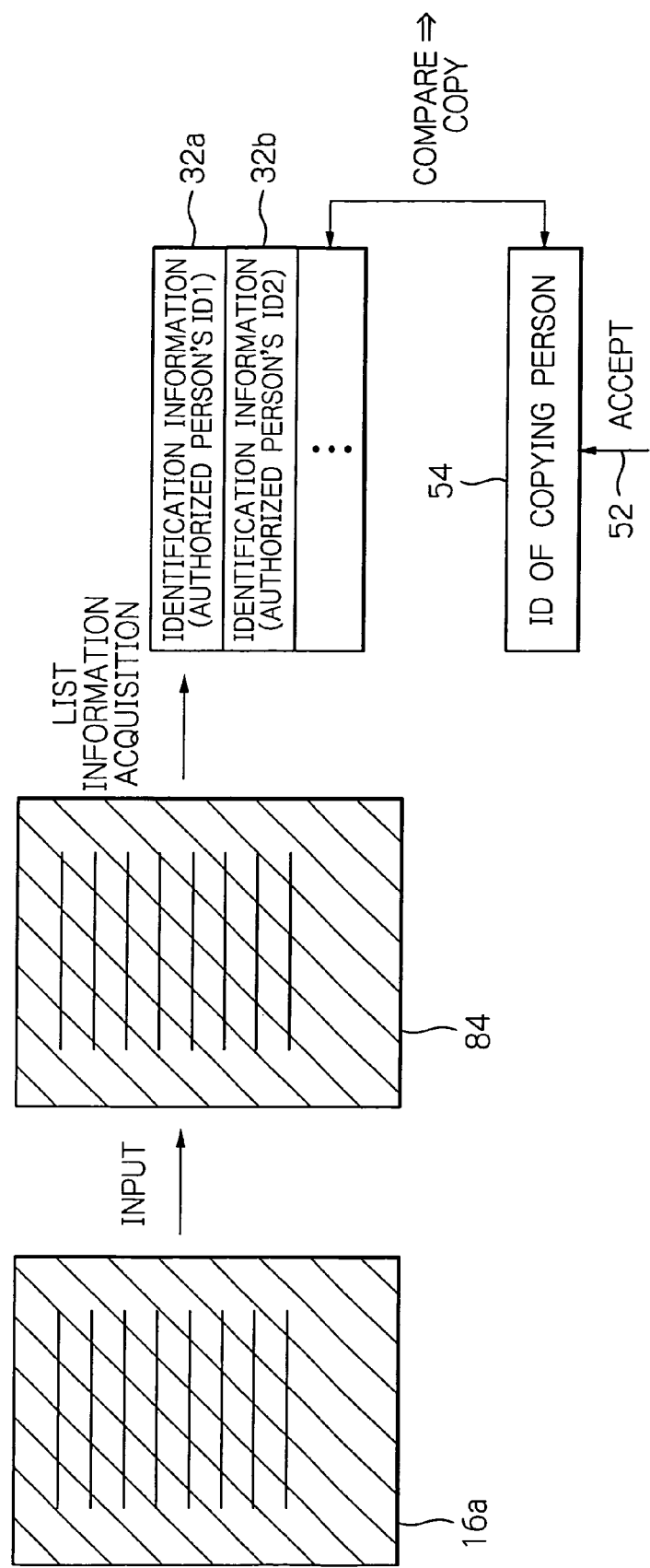

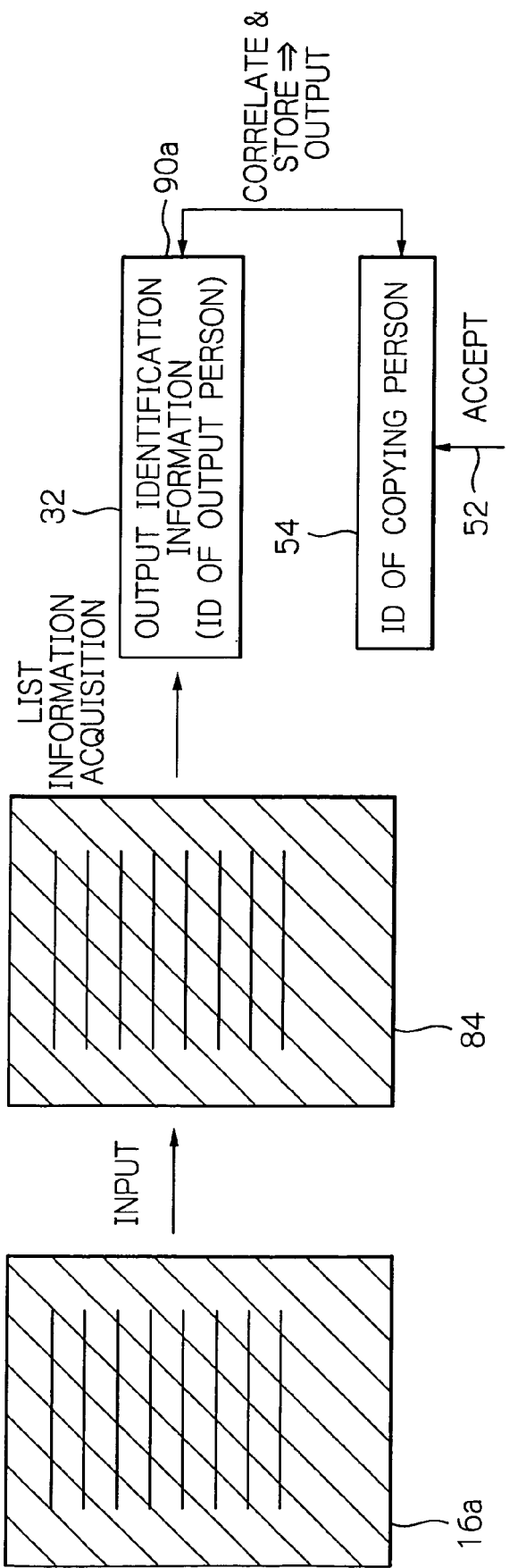

Fig. 15

| OUTPUT IDENTIFICATION INFORMATION 90a | COPY IDENTIFICATION INFORMATION 54 | COPY TIME INFORMATION 94 | OUTPUT TIME INFORMATION 96 | OUTPUT DESTINATION INFORMATION 98 |
|---|---|---|---|---|
| ID1 OF OUTPUT PERSON | ID1 OF COPYING PERSON | 05:10:05, DECEMBER 7, 2006 | 11:01:01, MAY 5, 2005 | 33.2.155.67 |
| ID2 OF OUTPUT PERSON | ID2 OF COPYING PERSON | 08:05:10, DECEMBER 7, 2006 | 03:03:03, MARCH 3, 2001 | 2.15.255.3 |
| ... | ... | ... | ... | ... |

FIG. 16

| IDENTIFICATION INFORMATION | DESTINATION OF NOTIFICATION |
|---|---|
| ID1 OF OUTPUT PERSON | ccc@bb.ne.jp |
| ID2 OF OUTPUT PERSON | fff@bbb.ne.jp |
| ⋮ | ⋮ |

104 / 106 / 100

SYSTEM FOR MANAGING FLEXIBLE COPYING WITH INFORMATION LEAKAGE PREVENTED AND/OR DETECTED

BACKGROUND OF THE INVENTION

1. Field of the Invention

The present invention relates to a copy management system and, more particularly, to a copy management system including an output device embedding a specific code in an image to output the image with the embedded code and a copying device determining the specific code thus embedded in the image to control its copying process.

2. Description of the Background Art

It may be an occurrence that a confidential document, output by an output device, such as a printer, is inadvertently copied. There are a number of cases where confidential information contained in the confidential document leaks from a copied confidential document due to ease in copying. The leakage of confidential information has posed a serious social problem.

Several methods have so far been proposed to combat the problem of secret leakage. Some of the methods are proposed in Japanese patent laid-open publication Nos. 2003-101762, 2005-333359, 111161/1990 and 2004-260341. However, with these proposed methods, the means for solution may readily be detected to lead to copying of the confidential document.

The Japanese '161 publication shows a method whereby the source of leakage may readily be located in case of leakage of confidential information to outside due to copying. The disclosed method consists in a bar code representing tracking information, such as information for identifying a copying device used for copying, or copying time and/or date, and appending the bar code to the text to be copied. However, this method suffers a problem that, in copying, the bar code may be hidden or replaced by another bar code to render it difficult to detect the source of leakage to permit ready copying.

The Japanese '762 publication discloses utilizing the watermarking technique. The Japanese '359 publication discloses a method for automatically printing information on a printing person, the size of a printed matter or the printing process on the ground pattern of the printed matter in its entirety. With these printing methods, in which information on a printing person, for example, may repeatedly be embedded in the entire background of the surface of a printing paper, the information on the printing person may be sensed even though the printed matter is partially hidden or sliced out.

These printing methods are highly effective in locating the source of leakage. However, these methods do not aim at combating the leakage. It is therefore not possible with these methods to restrict the copying of a printed matter.

The Japanese '341 publication discloses a method in which a certain ground pattern is printed in the background of a confidential document. If a copying device has detected the ground pattern, it inhibits copying. With this method, the printing of a printed matter with a ground pattern is inhibited without exceptions. Hence, with this method, even a person higher in competence than a person authorized to allow for printing or a person authorized to duplicate a confidential document is unable to copy the confidential document.

SUMMARY OF THE INVENTION

It is therefore an object of the present invention to provide a copy management system whereby copying may be managed flexibly to enable at least one of prevention and detection of information leakage caused by copying.

In accordance with the present invention, there is provided a copy management system including a copying device and an output device. The output device outputs an image, having information embedded therein, to control the processing for copying carried out by the copying device. The output device includes an information generator for generating the list information having one or more pieces of identification information identifying at least one of a person authorized for copying on the copying device and a group of a plurality of the persons authorized for printing. The output device also includes a first image generator for generating a print image based on the original information containing at least one of a letter, a character, a figure, a symbol and a mark, and a combination of at least two of the letter, character, figure, symbol and mark. The output device also includes a second image generator for encoding the list information to convert the list information to a specific code and for embedding the specific code thus obtained on conversion in the print image to generate a code-embedded print image. The output device further includes a printer for outputting the code-embedded print image. The copying device includes an information input unit for receiving and accepting at least one of the information about a copying person doing a copying operation on the copying device and the information about a copying group to which belongs the copying person, as the copier identification information that identifies the information indicating the allowance for copying. The copying device also includes an input unit for receiving the code-embedded print image to generate an input image. The copying device also includes an information acquirer for acquiring the specific code embedded in the code-embedded print image from the input image to decode the specific code acquired to acquire at least the list information from the specific code decoded. The copying device also includes a copying determiner for comparing the identification information with the copier identification information, comprised in the list information acquired, to decide on allowance/non-allowance in accordance with the result of comparison. The copying device further includes a copying unit for copying the code-embedded print image, responsive to the allowance for copying from the copying determiner, with the input image as a new output of the output device.

With the copy management system, according to the present invention, the list information, containing the identification information, is generated by an information generator in an output device, a print image, based on the original information, is generated by the first image generator, a code-embedded print image is generated in a second image generator, and the code-embedded print image is output by the output unit. Thus, the print image having the non-readable code embedded is printed on a printing medium. The information input unit in the copying unit receives the copier identification information, and the input unit generates an input image from the code-embedded print image. The information acquisition unit acquires the list information and the copying decision unit compares the identification information and the copier identification information to each other to decide on copying allowance/non-allowance based on the results of comparison. The copying unit copies the code-embedded print image responsive to the allowance for copying. In this manner, the copying processing may be limited, or the information about the copying may be recorded to provide for flexible management of the copying to enable prevention or detection of information leakage without loss of ease in use.

In accordance with the present invention, there is also provided a copy management system including a copying device and an output device. The output device outputs an image, having the predetermined information embedded therein, to control the processing for copying carried out by the copying device. The output device includes an information generator for generating the list information having one or more pieces of identification information identifying at least one of a person authorized for copying on the copying device and a group of a plurality of the persons authorized for printing. The output device also includes a first image generator for generating a print image based on the original information containing at least one of a letter, a character, a figure, a symbol and a mark, and a combination of at least two of the letter, character, figure, symbol and mark. The output device also includes a second image generator for encoding the list information to convert the list information into a specific code and for embedding the specific code thus obtained on conversion in the print image to generate a code-embedded print image. The output device further includes a printer for outputting the code-embedded print image. The copying device includes an information input unit for accepting, as the copier identification information indicating the allowance for copying, at least one of the information about a copying person doing a copying operation by the copying device and the information about a copying group to which belongs the copying person. The copying device also includes an input unit for receiving the code-embedded print image to generate an input image, and a copying device for copying the code-embedded print image, with the code-embedded print image as a new output of the output unit, responsive to acceptance of the identification information. The copying device also includes information acquirer for acquiring the specific code embedded in the code-embedded print image, from the input image, decoding the specific code acquired, and for acquiring, from the decoded specific code, the list information including at least the identification information. The copying device also includes a memory for storing, in a correlated fashion, the output identification information and the copier identification information. The memory is retrieved responsive to a request for retrieval of the copier identification information. The output identification information and the output identification information are among the identification information contained in the list information. The output identification information is contained in at least one of the information about an output person outputting the code-embedded print image from the output device to outside and the information about an output group to which belongs the output person. The copying device further includes an output unit accepting the inputting of the copier identification information, and acquiring the relevant copier identification information as a result of retrieval from the memory based on the copier identification information accepted. The output unit outputs the copier identification information acquired and the output identification information.

With the copy management system, according to the present invention, the list information, containing the identification information, is generated by an information generator in an output device, and a print image, based on the original information, is generated by the first image generator. A code-embedded print image is generated in a second image generator, and the code-embedded print image is output by the printer. Thus, a print image having a non-readable code embedded is printed on a printing medium. The information input unit in the copying device receives the copier identification information, and the input unit generates an input image from the code-embedded print image. The information acquirer acquires the list information. The output identification information and the copier identification information are stored correlated in the memory. The memory may be retrieved responsive to a request for retrieving the copier identification information. The output unit acquires, as the result of retrieval from the memory, the copier identification information and the output identification information, correlated with each other, and outputs the copier identification information and the output identification information, correlated with each other. In this manner, the copying processing may be limited, or the information on the copying may be recorded to provide for flexible management of the copying to enable prevention or detection of information leakage without loss of ease in use.

In accordance with the present invention, there is also provided an output device for outputting an image having the predetermined information embedded therein, to control the processing for copying by a copying device. The output device includes an information generator for generating the list information having one or more pieces of identification information identifying at least one of a person authorized for copying on the copying device and a group of persons authorized for printing. The output device also includes a first image generator for generating a print image based on the original information containing at least one of a letter, a character, a figure, a symbol and a mark, and a combination of at least two of the letter, character, figure, symbol and mark. The output device also includes a second image generator for encoding the list information to convert the list information into a specific code and for embedding the specific code thus obtained on conversion in the print image to generate a code-embedded print image, and an information output unit for outputting the code-embedded print image.

With the output device, according to the present invention, the list information, containing the identification information, is generated by an information generator in an output device. A print image, based on the original information, is generated by the first image generator. A code-embedded print image is generated in a second image generator, and the code-embedded print image is output by the printer. Thus, the copying processing may be limited, or the information on the copying may be recorded to provide for flexible management of the copying to enable prevention or detection of information leakage without loss of ease in use.

In accordance with the present invention, there is also provided a copying device for controlling the processing of copying based on the predetermined information embedded in an image output from an output device. The copying device includes an information input unit for accepting, as the copier identification information specifying the allowance for copying, at least one of the information about a copying person doing a copying operation by the copying device and the information about a group of the copying persons. The copying device also includes an input unit for receiving the code-embedded print image output from the output device to generate an input image. The copying device also includes an information acquirer for acquiring the specific code embedded in the code-embedded print image from the input image to decode the specific code acquired to acquire from the specific code decoded at least the list information including one or more pieces of identification information identifying at least one of a person authorized for copying by the output device and a group of the persons authorized for copying by the output device. The copying device also includes a copying determiner for comparing the identification information and the copier identification information, comprised in the list information acquired, to decide on copying allowance/non-allowance in accordance with the results of comparison. The copying device further includes a copier for copying the code-embedded print image, responsive to the allowance for copying from the copying decision unit, with the input image as a new output of the output device.

With the copying device, according to the present invention, the information input unit in the copying device receives the copier identification information, and the input unit generates an input image from the code-embedded print image. The information acquisition unit acquires the list information and the copying decision unit compares the identification information and the copier identification information to each other to decide on copying allowance/non-allowance based on the results of comparison. The copying unit copies the code-embedded print image subject to the allowance for copying. Thus, the copying processing may be limited, or the information on the copying may be recorded to provide for flexible management of the copying to enable prevention or detection of information leakage without loss of ease in use.

In accordance with the present invention, there is also provided a copying device for controlling the processing of copying based on the predetermined information embedded in an image output from an output device. The copying device includes information input unit for accepting, as the identification information specifying the allowance for copying, at least one of the information about a copying person doing a copying operation by the copying device and the information about a group of the copying persons. The copying device also includes an input unit for receiving the print image having the identification information embedded by the output device, to generate an input image. The copying device also includes a copier for copying the code-embedded print image, with the input image as a new output, responsive to acceptance of the identification information. The copying device also includes an information acquirer for acquiring the specific code, embedded in the code-embedded print image, from the input image, decoding the specific code acquired on decoding, and acquiring the list information at least containing the identification information from the decoded specific code. The copying device also includes a memory for storing, in a correlated fashion, the output identification information, as the outputting allowing identification information, and the copier identification information, included in the identification information contained in the list information. The memory is retrieved responsive to a request for retrieval of the copier identification information. The outputting allowing output identification information is contained in at least one of the information about an output person outputting the code-embedded print image from the output device to outside and the information about an output group to which belongs the output person. The copying device also includes an output unit accepting the inputting of the copier identification information, and acquiring the relevant copier identification information and the identification information correlated with the copier identification information, as a result of retrieval from the memory based on the copier identification information accepted. The output unit outputs the copier identification information and the output identification information acquired.

With the copying device, according to the present invention, the information input unit in the copying unit receives the output identification information, and the input unit generates an input image. The information acquirer acquires the list information and the memory stores the output identification information and the copier identification information are stored in correlation with each other. The memory may be retrieved responsive to a request for retrieval of the copier identification information. The output unit acquires, as the result of the retrieval from the memory, the copier identification information and the output identification information, correlated with the copier identification information, and outputs the output identification information, correlated with the copier identification information. In this manner, the copying processing may be limited, or the information on the copying may be recorded to provide for flexible management of the copying to enable prevention or detection of information leakage without loss of ease in use.

BRIEF DESCRIPTION OF THE DRAWINGS

The objects and features of the present invention will become more apparent from consideration of the following detailed description taken in conjunction with the accompanying drawings in which:

FIG. 1 is a schematic block diagram showing a preferred embodiment of a copy management system according to the present invention;

FIG. 2 is a schematic block diagram showing the configuration of an output device in the copy management system shown in FIG. 1;

FIG. 3 is a schematic block diagram of a copying device in the copy management system shown in FIG. 1;

FIG. 6 is a cross-sectional view schematically showing changes in pixel values for the signal of FIG. 5A, as seen in the direction of arctangent $\frac{1}{3}$;

FIG. 10 schematically shows the operating principle of the output device shown in FIG. 2 in the copy management system;

FIG. 11 schematically shows the operating principle of the copying device shown in FIG. 3 in the copy management system;

FIGS. 13A and 12B schematically show exemplified structures of the list information handled in the copying device shown in FIG. 12;

FIG. 14 schematically shows the operating principle of the copying device shown in FIG. 12;

FIG. 15 exemplarily shows the data structure of a set of information correlated together by a correlation memory included in the copying device shown in FIG. 12; and FIG. 16 schematically shows the data structure of a lookup table of destinations of notification used in another alternative embodiment of a copying device according to the present invention.

DESCRIPTION OF THE PREFERRED EMBODIMENTS

Figure 4A:
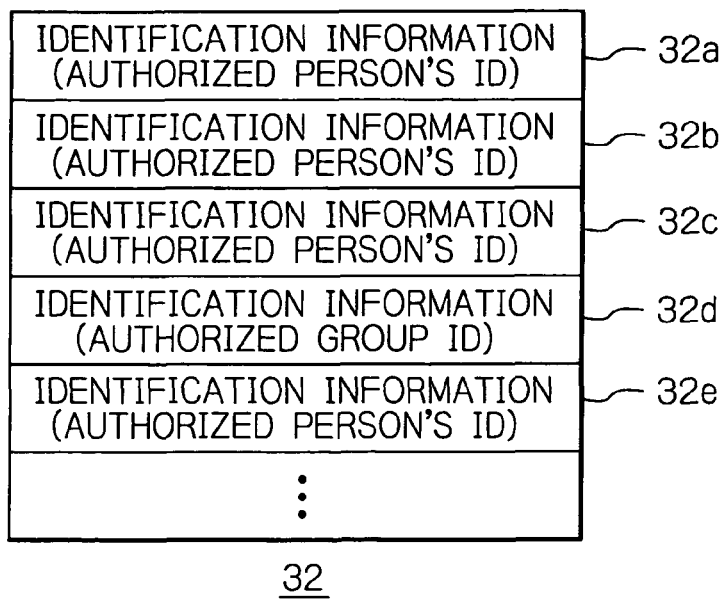
FIGS. 4A and 4B schematically show exemplified structures of the list information handled in the copy management system shown in FIG. 1.

Preferred embodiments of the copy management system according to the present invention will now be described with reference to the accompanying drawings. A specific embodiment of the copy management system 10 according to the present invention, shown in FIG. 1, is generally made up of an output device 12 and a copying device 14.

With reference to FIG. 2, the output device 12 includes an image generator 18 generating a print image 30, and a list information generator 20 generating list information 32 including identification information for identifying a person authorized for copying. The output device 12 further includes an embedding circuit 22 which converts the list information 32 to a specific code to embed the so generated specific code in the print image 30 to produce a code-embedded print image 34, and a printer 24 which outputs the so produced code-embedded print image 34 to print the latter on a printing medium 16.

With reference to FIG. 3, the copying device 14 includes an input unit 38 which senses the code-embedded print image 34 outputted on the printing medium 16, and an information input unit 46 which receives and accepts copier identification information 52 identifying a copying person. The copying device 14 further includes a list information acquirer 42 acquiring the list information 32 from a code-embedded print image 48, and a copying determiner 44 comparing identification information 50 included in the list information 32 acquired from the list information acquire 42 to copier identification information 54 accepted. The copying determiner 44 decides on allowance/non-allowance of the copying, based on coincidence/non-coincidence resultant from comparing both of the above information. The copying device 14 also includes a copier 40 which outputs a printed copy 58 in case copying is allowed.

Thus, with the copy management system 10, limitations are imposed on copying, or information pertinent to copying is recorded to thereby provide for flexible copying to prevent or promptly detect information leakage without loss of the merit of ease in use. In the following, parts or components not directly relevant to understanding the present invention are not shown or described. In the following description, signals are denoted by connection lines on which appear the signals.

Generally, in the copy management system 10, information is transferred between the output device 12 and the copying device 14 in the form of visual matter formed on the printing medium 16, such as a paper sheet.

The output device 12 has the function of formulating a print image based on text data 28 as original information, and embedded information, such as confidential information (stenographic information) embedded in the text to output the so formulated print image to a medium, such as a paper sheet.

The image generator 18 has the function of producing text data 28, as the original information, supplied from a storage 26. The storage 26 may be enclosed in the output device 12 or connected thereto as an external device. The image generator 18 outputs a print image 30, thus produced, to the embedding circuit 22.

Specifically, the print image is composed of an unprinted open pixel area, and a black pixel area, coated with black paint. It is presupposed, in the present embodiment, that printing is made on a white paper sheet with a monochromatic color, that is, with black ink. However, the present invention is not limited to this but may be applied in a similar manner to multi-color printing.

The list information generator 20 has the function of generating the list information including one or more pieces of identification information. The identification information is of identifying at least one of persons authorized for copying an output printed text 16 and a group of plural persons authorized for printing. Specifically, the identification information identifies a person or a group authorized for printing, and may be any form of information identifying an individual or user and an ID (IDentification) code therefor. The identification information will be described in detail subsequently. The list information generator 20 outputs the list information 32 thus generated to the embedding circuit 22.

The embedding circuit 22 has the function of encoding values digitalized from the list information supplied thereto into codes of N elements, where N is not less than two, and assigning the codes as a signal of specific codes 34 to a signal prepared in advance for code symbols. The embedding circuit 22 outputs the list information 32 supplied as specific code signals 34 to the printer 24.

The specific code signals are in the form of plural dots arrayed in a rectangular area of an appropriate size to represent a wave having its propagating direction and wavelength optional. That is, the symbols are allocated for the direction or wavelength of the wave. The watermark image is comprised of these code signals arrayed on an image in accordance with a certain rule. However, the list information 32 is not limited to a watermark image prepared based on the list information 32.

The copying decision information may be enumerated, in addition to the list information described above, by IDs of a printer or an output person, an IP (Internet Protocol) address for identifying the output device 12, an ID for identifying the location of the output device 12, and the time when the printed text was output. The embedding circuit 22 may formulate a watermark image based on one or more pieces of the decision information.

The embedding circuit 22 overlays the print image 30 provided from the image generator 18 and the watermarked image formulated based on the list information 32 from the list information generator 20, one on the other, to formulate a code-embedded print image 34. The embedding circuit 22 outputs the code-embedded print image 34, thus formulated, to the printer 24.

The embedding circuit 22 of the present embodiment may include, for example, the watermarked image generating function owned by the watermarked image formulating unit and the watermarked image embedding function owned by the watermarked text/image synthesis unit disclosed in the Japanese '762 publication stated earlier. Thus, the embedding circuit 22 is able to perform at least the functions proper to these two units.

The embedding circuit 22 of the present embodiment is assumed to produce a watermarked image based on the list information 32 supplied. However, the embedding circuit 22 may also perform other functions. For example, the embedding circuit 22 may formulate a watermarked image based on the list information generated by, for example the list information generator 20 per se.

The printer 24 may, for example, have the function of printing a code-embedded print image on a paper medium. The printer 24 prints a code-embedded print image 36. The printed text includes original text data 28 and the list information 32 embedded therein. The printer 24 may also output an embedded image as an electronic text of the PDF (Portable Document Format) format.

The output device 12 is not limited to the specific configuration of the present embodiment composed of the elements unified together. For example, the printer 24 maybe a separate unit. That is, the output device 12 may be provided with the embedding circuit 22 and with the list information generator 20, while the printer 24 may be a separate unit provided with the printing function.

With reference to FIG. 3, the copying device 14 takes in the printed text in the form of input image to restore the embedded list information, and controls the copying of an object to be copied, based on the list information, to thereby manage the copying. The copying device 14 includes the input unit 38, copier 40, list information acquirer 42, copying determiner 44 and information input unit 46, as shown in FIG. 3.

The input unit 38 has the function of taking in the text, printed on a paper sheet, as multi-valued grayscale image to produce an input image, and may, for example, be a scanner. The input unit 38 may also be an interface for directly receiving a PDF file of the printed text 16a or a code-embedded print image as input data. The input unit 38 delivers the produced print image 48 to the copier 40 and to the list information acquirer 42.

The list information acquirer 42 has the function of filtering the input image supplied to detect an embedded specific code to restore a symbol from the detected signal to take out the embedded list information. The list information acquirer 42 may have the function proper to a watermark detection unit of detecting the embedded a watermarked image and restoring the original information, as disclosed in, for example the Japanese '762 publication. Although the list information acquirer 42 owns at least the function proper to the watermark detection unit, it may not be restricted to the specific form of the illustrative embodiment. The list information acquirer 42 takes out the embedded list information 50 from the input image supplied to output the list information, thus taken out, to the copying determiner 44.

The information input unit 46 has the function of accepting copier identification information recorded on a copy card used during copying by a user. The information input unit 46 reads out embedded copier identification information 52 from the input image supplied to receive the so read out copier identification information 52. The information input unit 46 may also include the function of reading out copier identification information from the copy card. The information input unit 46 transfers the input copier identification information 52 as copier identification information 54 to the copying determiner 44.

The copier identification information 50 specifies at least one of a user who copies the printed text 16a and a user group the user belongs to. Specifically, the copier identification information 50 is the ID, for instance.

The copier identification information 50 may be of any kinds of information with which the copying user may be identified. For example, it may be the numbers of a company member or a copy card, the full name or mail or email address of a user, or biometric information generated from the finger print or iris pattern of a user. It may also be a magnetic stripe card, a non-contact IC (Integrated Circuit) card, a contact IC card or a card having a bar code or a two-dimensional bar code printed thereon.

The information input unit 46 is not limited to the specific form described above. With the illustrative embodiment described above, the copying user may manually enter the copier identification information 52. Alternatively, the copier identification information 52 may directly be entered from a copying user or automatically inputted from his/her physical features, such as fingerprint or iris. The information input unit 46 may, in such cases, be adapted to a magnetic card reader, an IC card reader or a bar code reader, or to input means, such as a keyboard or keypad, or to biometric authentication means, such as fingerprint sensor.

The copying determiner 44 has the function of comparing the identification information, included in the list information restored, to the copier identification information, and deciding on allowance/non-allowance for copying, based on the result of comparison. The copying determiner 44 provides the copier 40 with the allowance information 56, indicating the allowance/non-allowance, which is the result of comparison between the two pieces of information, as a control signal.

The copier 40 has the function of copying the input image responsive to the allowance information supplied. If the allowance information 56 supplied indicates the allowance, the copier 40 prints out an input image 49 on the printing medium 16, such as a paper sheet, to discharge the printed paper sheet as a copy 58.

Figure 4B:
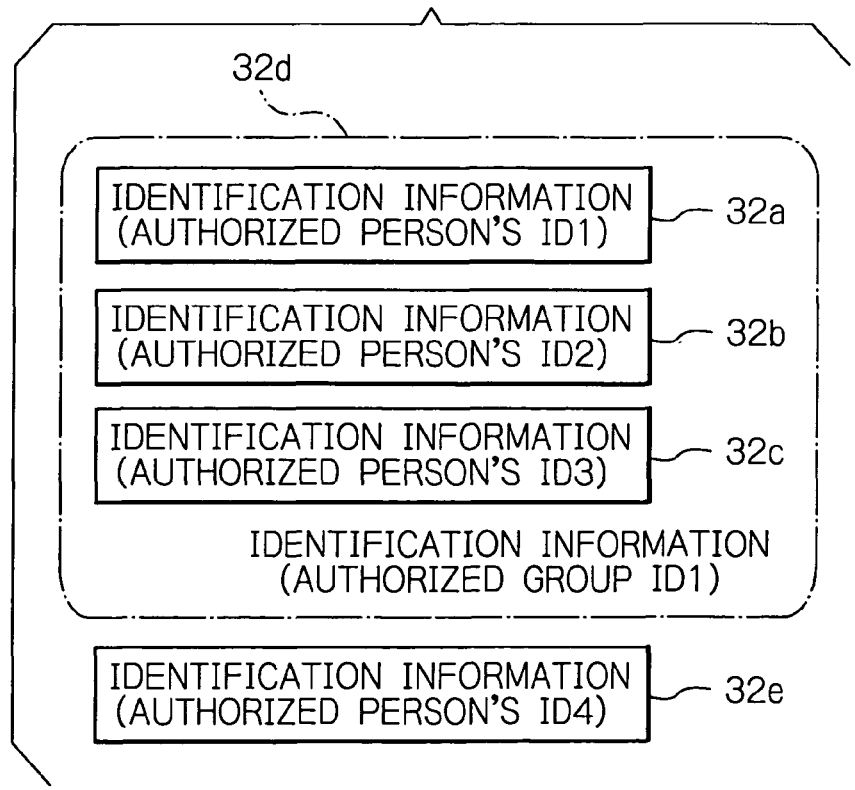

The operation of the copy management system 10 of the present embodiment will now be described. When an output party commands the output device 12 to make an output, the list information generator 20 generates the list information 32, including one or more IDs, with which it should be possible to identify one or more persons authorized for copying or one or more groups of persons authorized for copying. The list information 32 is the ID information identifying one or more persons authorized for copying or one or more groups of persons authorized for copying, as shown in FIGS. 4A and 4B, and includes a plural number of identification information 32a, 32b, . . . . Specifically, the identification information 32a is a personal ID for identifying a person authorized for copying, and the identification information 32d is a group ID for identifying a group of persons authorized for copying.

The group of persons authorized for copying includes plural persons commonly authorized for copying. Thus, when a user designates the group of persons authorized for copying as the information, copying of the printed text 16a is allowed, without requiring all persons belonging to the group in question to be designated. Moreover, since the identification information 32d is an ID for the group of persons authorized for copying, as shown in FIG. 4B, the copy management system 10 is able to determine the allowance/non-allowance for copying, only subject to inclusion of the identification information 32d in the list information 32. Thus, it is unnecessary to register the IDs of persons authorized for copying as included in the identification information 32a to 32c in the list information 32. The data structure of the list information 32 is not limited to the specific examples shown in FIGS. 4A and 4B.

For example, the list information generator 20 accepts from a user, such as a manager, the input of the IDs identifying the person(s) authorized for copying or the groups of persons authorized for copying to generate the list information 32, including the identification information, based on the IDs. The invention is not restricted to the specific embodiment. The list information 32 includes at least one of the identification information for a person(s) and a group of persons authorized for copying the printed text 16a, as described above.

Meanwhile, identification information is not limited to the specific examples in the present embodiment but may, for example, be the company member number, the number of a copy card, the full name or mail or email address of a user, or biometric information generated from the finger print or iris pattern of a user, provided that the person(s) authorized for copying may be identified from the identification information.

The identification information 32a, 32b, . . . is a numerical value expressed by four bytes. If different IDs are allocated to ten persons authorized for copying, for example, the list information 32 is expressed by 40 bytes. If the number of the persons authorized for copying is not fixed but variable, the list information 32 may also includes information about the number of the items of identification information. It is noted that each item is for different one of the persons authorized for copying.

The list information generator 20 may not only generate the identification information 32a, 32b, 32c, . . . , acquired in advance, subject to inputting by a manager of the copy management system 10, or an output person, but also store the information in a memory, not shown. In outputting the printed text 16a, the list information generator 20 may generate the relevant identification information, subject to inputting the information by the output person. The identification information 32a, 32b, 32c, . . . may also be classified in advance from one group of persons authorized for printing 32d to the next for storage in the list information generator 20. The identification information for the groups of persons may be designated by, e.g. the output person each time the printed text 16a is output.

The text data 28, supplied to the image generator 18, is original information including not only letters, characters, numerals, figures, symbols, marks or any combinations thereof, but also the font information on the letters and numerals, or layout information on the letters, characters, numerals, figures, symbols and marks, and is formulated on the word processor software.

The image generator 18 generates, from page to page, a print image 30, which is a document printed on a paper sheet based on the text data 28. The print image 30 is monochromatic, that is, a bi-level image of white and black. Open or white pixels of a value "1" on an image form the background, whereas black pixels of a value "0" form a letter area coated with ink. In other words, an open or white pixel area in the print image is a non-printed area, whereas the black pixel area is coated with the black paint.

The image generated by the image generator 18 of the output device 12 is not limited to such a monochromatic image, but may also be a multi-color image.

The embedding circuit 22 of the output device 12 generates a watermarked image, based on the list information 32, and embeds the watermarked image in the print image to produce the code-embedded print image 34. This embedding is carried out for each page of print image to embed the relevant list information, that is, the watermarked image, in that page of print image. The embedding circuit 22 receives the list information 32 and encodes the information 32 thus received with N-element coding to assign each symbol of the codeword to a watermarked signal, provided at the outset, that is, a dot pattern. The watermarked signal is an array of dots in a rectangular area of a given size to represent a wave having its direction and wavelength optional. To each watermarked signal is allocated a symbol for the direction or wavelength of the wave that expresses the signal. These signals are arrayed on an image in accordance with a certain rule to constitute a watermarked image.

A specified example of the watermarked signal will now be described. The dot pattern is made up of dots for black pixels arrayed in a predetermined direction of propagation at a predetermined interval. The luminance value of the dots of the dot pattern represents the amplitude, and the dot pattern has its propagation direction set substantially perpendicular to the predetermined direction. A plural number of dot patterns prepared are disposed in the form of various combinations of changes in direction and/or interval of the dots. The dot patterns, thus formed, become a watermarked image representing the contents of the list information.

Figure 5A:
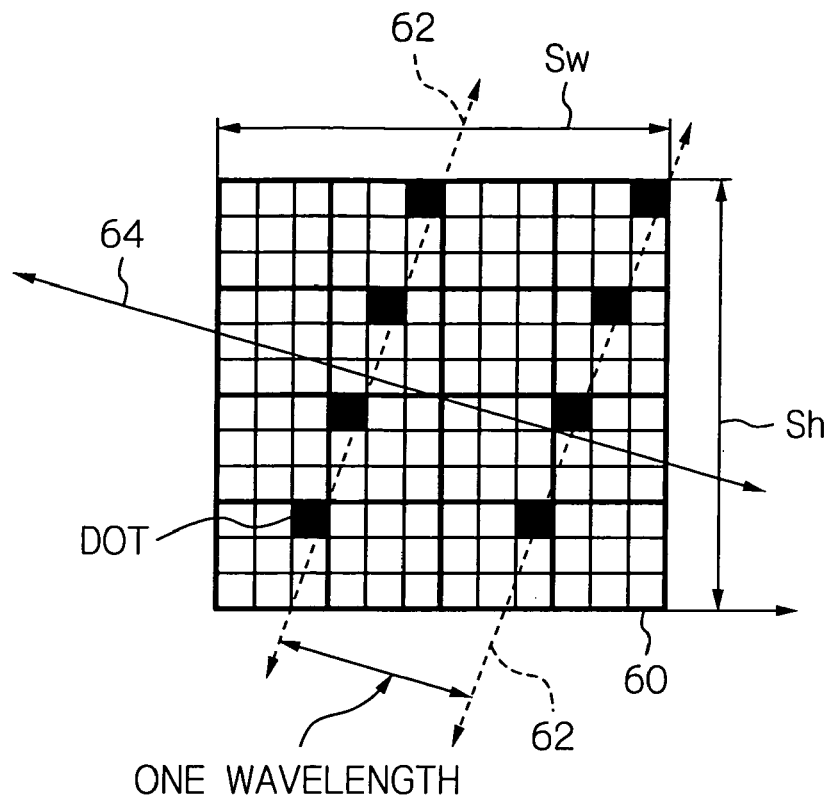
FIGS. 5A and 5B show units A and B, respectively, used as watermarked signals in the copy management system shown in FIG. 1.
Figure 5B:
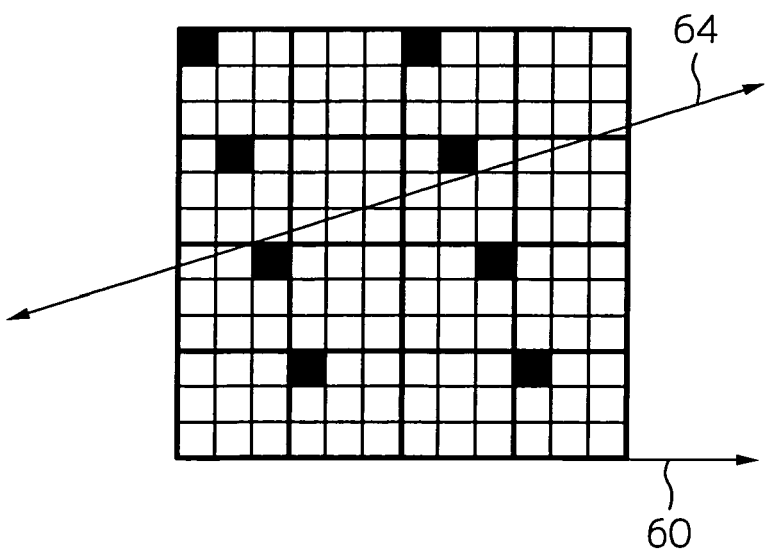

The watermarked signal, allocated to each symbol, will now be described with reference to FIGS. 5A and 5B. The width and the height of the watermarked signal are set to Sw and Sh, respectively, as shown in FIGS. 5A and 5B. The width Sw and the height Sh of the watermarked signal are set to satisfy the relationship of Sw=Sh, in the present embodiment, to provide for facilitated illustration. These values may, of course, differ from each other. The width and the height are represented by the number of the pixels. In the present embodiment, shown in FIGS. 5A and 5B, Sw=Sh=12. The size of these signals when printed on a paper sheet depends on the resolution of the watermarked image generated based on the list information 32. As a specified example, each of the width and height of the watermarked signals shown in FIGS. 5A and 5B for the image of 600 dpi (dots per inch), for example, are 12/600=0.02 on the printed text.

A rectangle with the width Sw and the height Sh is set as a unit of sole signal and is termed a "signal unit". The distances between the dots of FIG. 5A are dense in the direction of the arrow 62 of a function, arctangent (3), relative to the horizontal axis 60. The propagation direction of the wave is a function, arctangent (−⅓). The signal unit, shown in FIG. 5A, is termed a unit A. The distances between the dots of FIG. 5B are dense in the direction of a function, arctangent (−3), relative to the horizontal axis 60. The propagation direction of the wave is a function, arctangent (⅓). The signal unit, shown in FIG. 5B, is termed a unit B.

FIG. 6 shows a cross-section of changes in pixel values of FIG. 5A, as seen from the direction of the function, arctangent (⅓). In FIG. 5A, the point where the dot is arrayed represents a node 66 of the smallest value of the wave, that is, a point with the maximum wave amplitude. The point where the dot is not arrayed represents a peak 68 of the maximum value of the wave.

In the present embodiment, there are two areas with a dense dot array in each unit. Hence, the frequency for each unit is two. Since the direction of wave's propagation 64 is perpendicular to the direction 62 along which the dots are densely arrayed, the wave of the unit A is of the function, arctangent (−⅓), while the wave of the unit B is of the function, arctangent (⅓), each with respect to the horizontal direction.

When the direction of a function, arctangent (a) is perpendicular to that of a function, arctangent (b), a×b=−1.

In the present embodiment, a symbol "0" is allocated to the watermarked signal represented in the unit A, whilst a symbol "1" is allocated to the watermarked signal represented in the unit B. These symbols are termed symbol units.

Figure 7A:
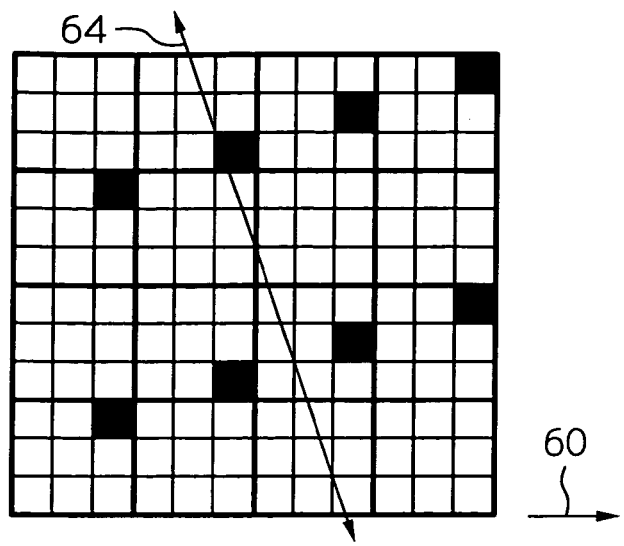
FIGS. 7A, 7B and 7C show units C, D and E, respectively, used as watermarked signals in the copy management system shown in FIG. 1.
Figure 7B:
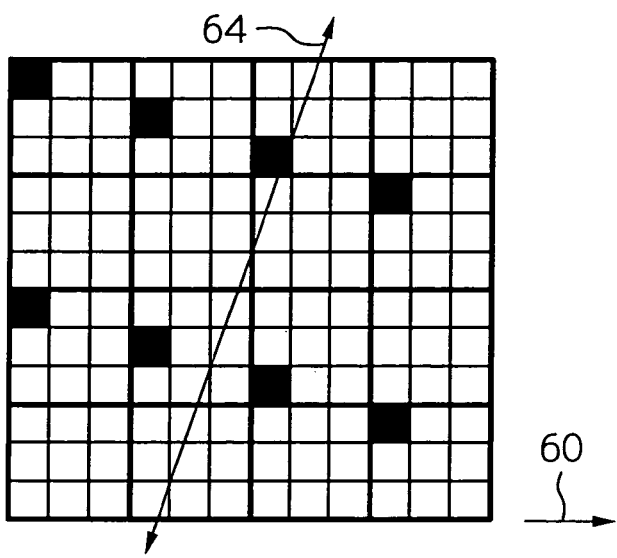

In addition to the dot arrays, shown in FIGS. 5A and 5B, those shown in FIGS. 7A and 7B may also be used as the watermarked signals. In FIG. 7A, the dot-to-dot distances are dense in a direction of the function, arctangent (⅓), relative to the horizontal axis 60, with the wave's propagation direction being the function, arctangent (−3). The signal unit, shown in FIG. 7A, is termed a unit C.

Figure 7C:
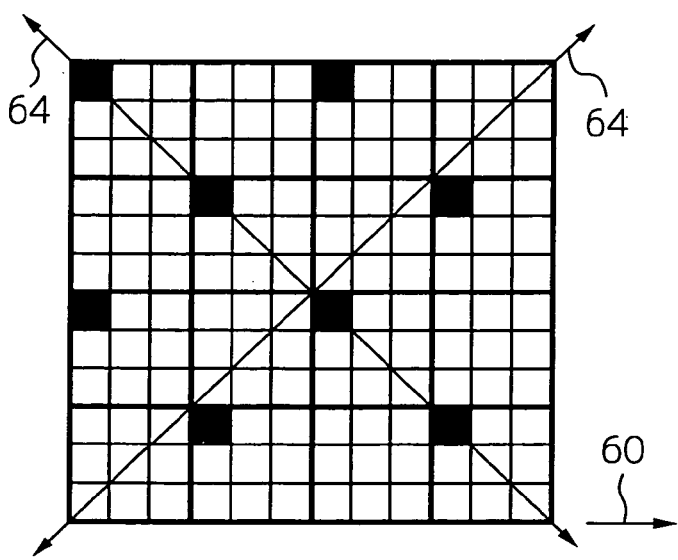

In the case of FIG. 7B, the dot-to-dot distances are dense in a direction of the function, arctangent (−⅓), relative to the horizontal axis 60, with the wave's propagation direction being the function, arctangent (3). The signal unit, shown in FIG. 7B, is termed a unit D. In the case of FIG. C, the dot-to-dot distances are dense in a direction of the function, arctangent (1), relative to the horizontal axis 60, with the wave's propagation direction 64 being the function, arctangent (−1). In the case of FIG. 7C, it may be said that the dot-to-dot distances are dense in a direction of the function, arctangent (−1), relative to the horizontal axis 60, as well, with the wave's propagation direction 64 being the function, arctangent (1). The signal unit, shown in FIG. 7C, is termed a unit E.

In the watermarked signals, shown in FIGS. 5A, 5B, 7A and 7B, the numbers of dots in one unit are set to be equal to one another. Thus, if these units are arrayed without gap, the apparent gray level of the watermarked images may be made even, so that a gray image with a uniform grayscale level may appear to be embedded as a background.

In order to display this background effect, a signal unit to which no symbol is allocated, that is, a unit E, is defined as a background unit. In the print image, these background units are arrayed without gap to form the background for the watermarked image.

In embedding the symbol units A and B in the watermarked image, the symbol units A and B are substituted for the background units (units E) at the positions where the symbol units are to be embedded.

Figure 8A:
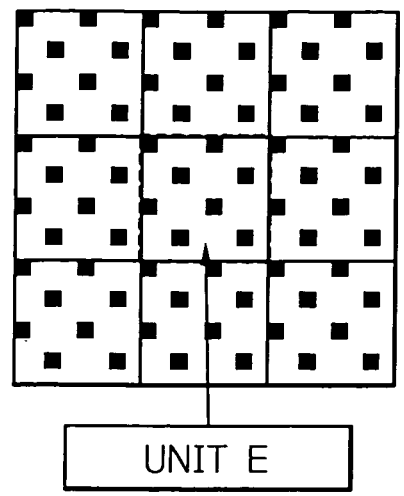
FIG. 8A shows a background image in which a unit A in the copy management system shown in FIG. 1 is defined as a background unit and a number of these units are arrayed without gap between each other to form a background for a watermarked image.
Figure 8B:
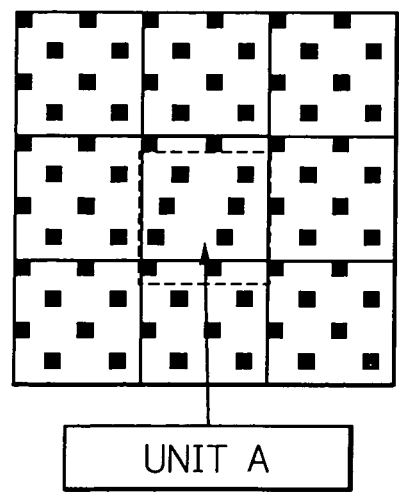
FIGS. 8B and 8C show background images in which a number of units A and B, respectively, are embedded in the background unit of the unit E in the copy management system shown in FIG. 1.
Figure 8C:
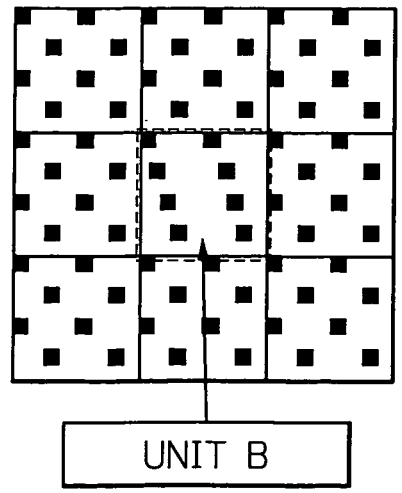

FIG. 8A shows dot patterns for the copy management system 10 of the present embodiment, in which the units E are set as the background units, and are arrayed without gap to form the background for the watermarked image. FIG. 8B shows an example in which the unit A is embedded in the background image of FIG. 8A. FIG. 8C shows an example in which the unit B is embedded in the background image of FIG. 8A. The present embodiment is directed to using the background units as the background for the watermarked image. It is however also possible to array only the symbol units to generate a watermarked image.

Figure 9A:
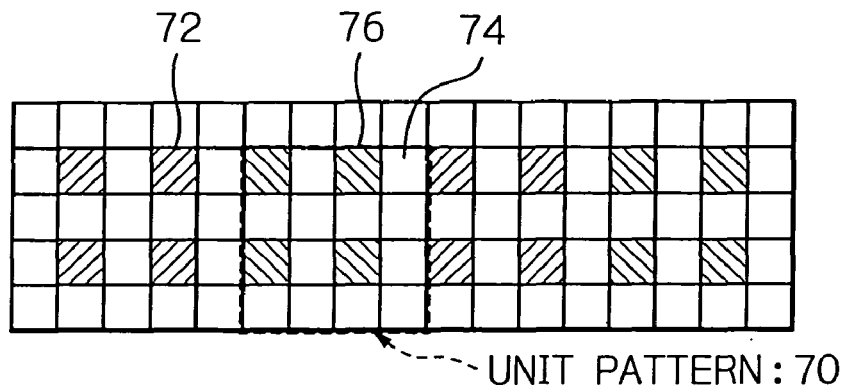
FIGS. 9A, 9B and 9C show watermarked images in which symbols are embedded with the number of repetitions of four, two and four, respectively, in the unit pattern in the copy management system shown in FIG. 1.
Figure 9B:
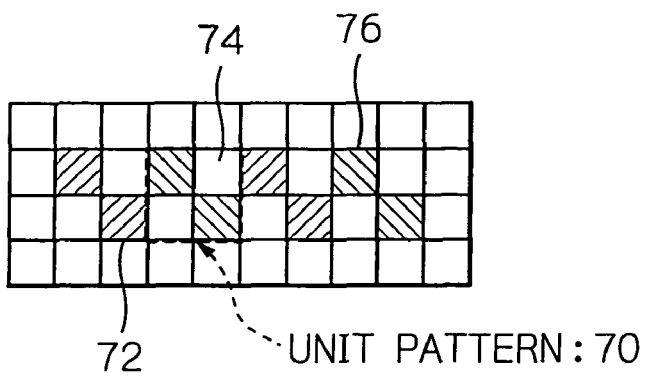
Figure 9C:
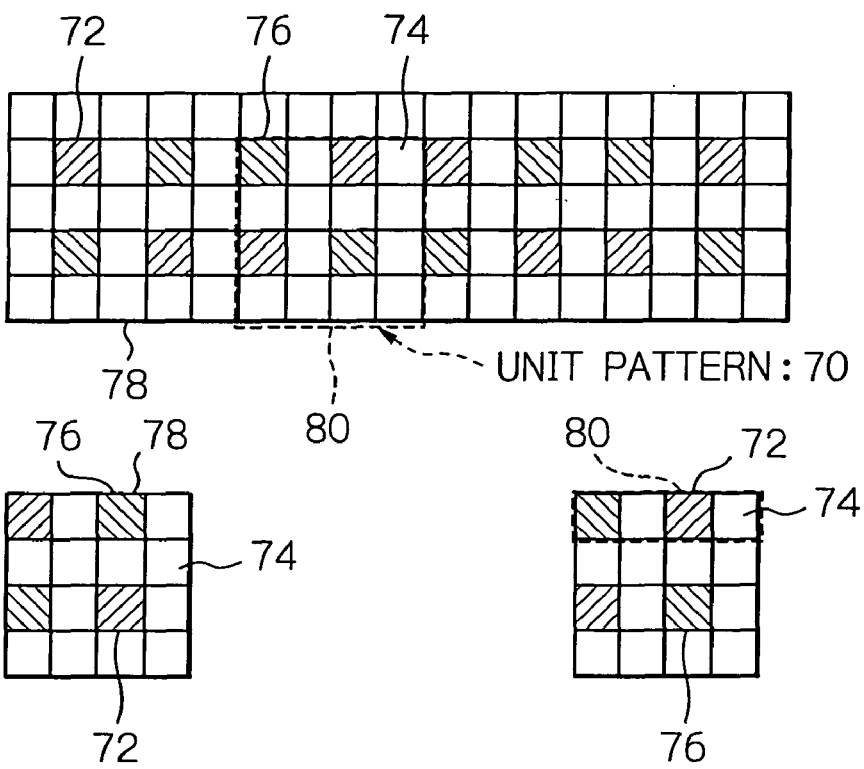

An example of embedding a symbol in the watermarked image is shown in FIGS. 9A, 9B and 9C. The present embodiment is directed to the case where a sequence of bits "0101" is to be embedded. FIGS. 9A and 9B show a pattern obtained on repeatedly embedding the same symbol units. This dot pattern is effective to prevent detection failure at the time of detection even for a case where a letter in the text is superposed on the embedded symbol unit or for a case where there is some cutting off or contamination after printing. The number of repetitions is defined by the repetitive number of the symbol units present in a unit pattern 70. Hence, the unit pattern 70 is arbitrary and represented by a pattern of the number of repetitions and arraying patterns of the symbol units.

FIG. 9A shows an example of the unit patterns 70. In this example, the number of repetitions of the units is four. In this case, the number of the unit patterns 70 is sixteen. Used are a pattern including four units A (72) representing the symbol "0" and twelve units E (74) representing no symbols, and a pattern including four units B (76) representing the symbol "1" and twelve units E (74).

In the unit pattern 70 of FIG. 9B, the number of repetitions is two of the four units, and the units A (72), E (74) and B (76) are used. In the unit pattern 70, the number of repetitions may be unity.

In the unit pattern 70, a unit pattern 78 that affords a symbol "0" and a unit pattern 80 that affords a symbol "0" may be used for a symbol unit arraying pattern, as shown in FIG. 9C.

The processing for embedding by the embedding circuit 22 will now be described. The embedding circuit 22 overlays the print image 30 formulated and supplied thereto, with a watermarked image formulated based on the list information 32, one on the other, to form a code-embedded print image 34, as shown in FIG. 10. The values of the pixels in the code-embedded print image 34 are calculated by taking the logical product of the binary values of mating pixels of the print image 30 and the watermarked image by a logical product (AND) 82, for instance. In this processing, if either the print image or the watermarked image is "0", that is, black, the pixel value of the code-embedded print image 34 is "0", that is, black. Otherwise, the pixel value is "1", white.

In the code-embedded print image 34, the watermarked image for embedding is embedded distributed throughout the entire background. The embedded watermarked image is scarcely readable. As a result of this processing, even the person who instructed formulating the code-embedded print image 34 can hardly grasp information on the original list information 32 from the watermarked image. What has been stated above as to the code-embedded print image 34 may be said of the printed image 16a as well. The code-embedded print image 34 is printed by the printer 24 on the printing medium 16, such as paper sheet, and output as the printed image 16a.

The operation of the copying device 14 will now be described. A copying person sets the printed text 16a, desired to be copied, on the input unit 38. The input unit 38 optically scans and reads the printed text 16a being copied by the copying person, in order to convert the printed text into digital image data, as shown in FIG. 3. The digital image data, thus obtained on conversion, becomes an input image 84 shown in FIG. 11. The input image 84, thus read out, is transmitted from the input unit 38 to the copier 40 and to the list information acquirer 42.

The copying personal so inputs to the information input unit 46 the copier identification information 52. This copier identification information 52 identifies the copying person recorded on the copy card. Provided that the copying person is the same as the person who has output the printed text 16a from the output device 16, then the copier identification information 52 indicates that the copying person is identical with the output person. However, if the copying person is different than the output person, then the copier identification information indicates that the copying person is different than the output person.

Meanwhile, the copier identification information 52 is the information comparable with the identification information afforded by the output device 12 as the information on the person(s) authorized for copying or the group(s) of persons authorized for copying. That is, if the copier identification information 52 is the ID, the identification information is also the ID for the person authorized for copying. If the copier identification information 52 is the biometric information for the fingerprint, then the identification information is also the biometric information for the fingerprint.

The list information acquirer 42 acquires the watermarked image from the input image 84 supplied, and restores the list information 32, based on the so acquired watermarked image. Although the input image 84 is a multi-valued image, for instance, it is not mandatory.

The list information 32, as the watermarked image, is embedded in the code-embedded print image 34 a plural number of times for redundancy. Hence, it is not essential that the list information acquirer 42 reads out the watermarked image from the input image 84 in its entirety to restore the list information 32 from the so read out watermarked image. It is therefore possible for the list information acquirer 42 to extract the watermarked image from a part of the image area of the input image 84 sufficient to restore the list information 32 to acquire the list information 32.

The list information acquirer 42 also acquires a watermarked image from the input image 84 and carries out filtering for the input image 84 for restoring the list information to compare the calculated filter output value to the actual filter output value. In calculating the filter output value, the convolution between a filter used and an image is calculated, for all of the pixels of the input image 84. The filter used is a Gabor filter.

The list information acquirer 42 then calculates the filter output values for all filters associated with the signal units. The list information acquirer 42 then compares the filter output values in the pixels to the filter output values calculated as described above to store the maximum value F (x, y) as a matrix of the filter output values. The list information acquirer 42 also holds on memory the numbers of the signal units associated with the filter with the maximum value as a filter sort matrix.

The list information acquirer 42 then decides on the signal position of the signal unit, using the so obtained matrix of the filter output values, to specify the sort of the signal unit. The list information acquirer 42 holds on memory the result of decision on the signal unit, thus decided on, as a symbol matrix.

In deciding on the signal position, if the size of the signal unit is expressed by the height Sh×width Sw, then the list information acquirer 42 formulates a signal position retrieving template. In this template, there are included the spacing between lattice points in the vertical direction Sh, the spacing between lattice points in the horizontal direction Sw and the number of lattice points Nh×Nw.

Finally, the list information acquirer 42 restores the part of the symbol matrix, lying within the signal boundary, as the original list information 32.

In order to restore the original list information 32 from the acquired watermarked image, the list information acquirer 42 detects the symbols, embedded in each unit pattern, and concatenates the so detected symbols to restore the data code. The list information acquirer 42 then decodes the data code to take out the embedded list information 32. The list information acquirer 42 of the present embodiment has the function of a watermark detector of detecting the watermarked image to restore the original information, as disclosed in the Japanese '762 publication, for instance.

The list information 32 is restored based on the watermarked image acquired from the input image 84 by the list information acquirer 42. In addition to the list information 32, if the information on the output time, outputting the printed text 16a, for example, is embedded as the watermarked image, such information is also restored, based on the watermarked image acquired from the input image 84. It is noted that the list information 32, restored from the input image 84, is the same as embedded in the above-described code-embedded print image 34.

The list information acquirer 42 outputs the restored list information 50 to the copying determiner 44. The copying determiner 44 checks for possibility for copying. Specifically, the copying determiner 44 compares the identification information 32a, 32b, 32c, . . . contained in the restored list information 50, to the copier identification information 54 supplied, as shown in FIG. 11. If the copier identification information 54 is the ID for the group of copying persons, the copier identification information 54 may be an ID for the copying person or an ID for the group of the copying persons.

The copying determiner 44 compares the ID for the copying person to the identification information 32a, 32b, . . . and, if there is the copier identification information 54, coinciding with the ID for the copying person, in the list information 32, then the copying determiner 44 outputs the control signal 56, allowing for copying, to the copier 40. Otherwise, the copying determiner 44 outputs the control signal 56, inhibiting the copying, to the copier 40.

Even in case some of the identification information 32a, 32b, . . . , included in the list information 32, coincides with some of the copier identification information 54, the copying determiner 44 inhibits the copier 40 from copying. However, the copying determiner 44 may allow the copying. If the list information 32 is restored in an incomplete form, such as due to pollution of the printed text 16a, the identification information 32a, 32b, . . . may coincide with a part of the copier identification information 54.

Finally, when the copier 40 is supplied with the allowance information 56 as a control signal, the copier 40 converts the print image 48 to a signal form suited for printing, and prints the resulting print image on the printing medium 16, such as paper sheet, to output the result as the copy 58. The conversion to a signal form suited for printing, which may differ with the characteristics of the copier 40, may be exemplified by conversion of density or contrast. The copier 40 is not limited to the case of printing on the printing medium 16, as in the present embodiment. For example, the input image may be output as the copy 58 in the form of an electronic document of the PDF format.

Thus, with the copy management system 10, in which the identification information for a person authorized for copying, in the printed text 16a, is recorded as the digital information in the background of the printed text 16a, that is, in the ground pattern for the printed text 16a, the person authorized for copying may freely copy the printed text 16a without loss of the merit of ease in use. However, those not authorized for copying may be prohibited from copying the printed text 16a, so that it is possible to prevent the information leakage otherwise caused by the copying of the printed text 16a. Additionally, since the persons or groups authorized for copying may freely be designated from one page of the printed text 16a to the next, it is possible to take flexible security measures depending on the contents of the printed matter.

Now, an alternative embodiment of the copy management system 10 according to the present invention will be described. In the following description, parts or components in common with the previous embodiment are designated by the same reference numerals and a repetitive description will be omitted for simplicity. As seen from FIG. 12, the alternative embodiment may be the same as the previous embodiment except that it has no components corresponding to the copying determiner 44 and instead includes a correlation memory 86 and an output unit 88.

Figures 13A, 13B:
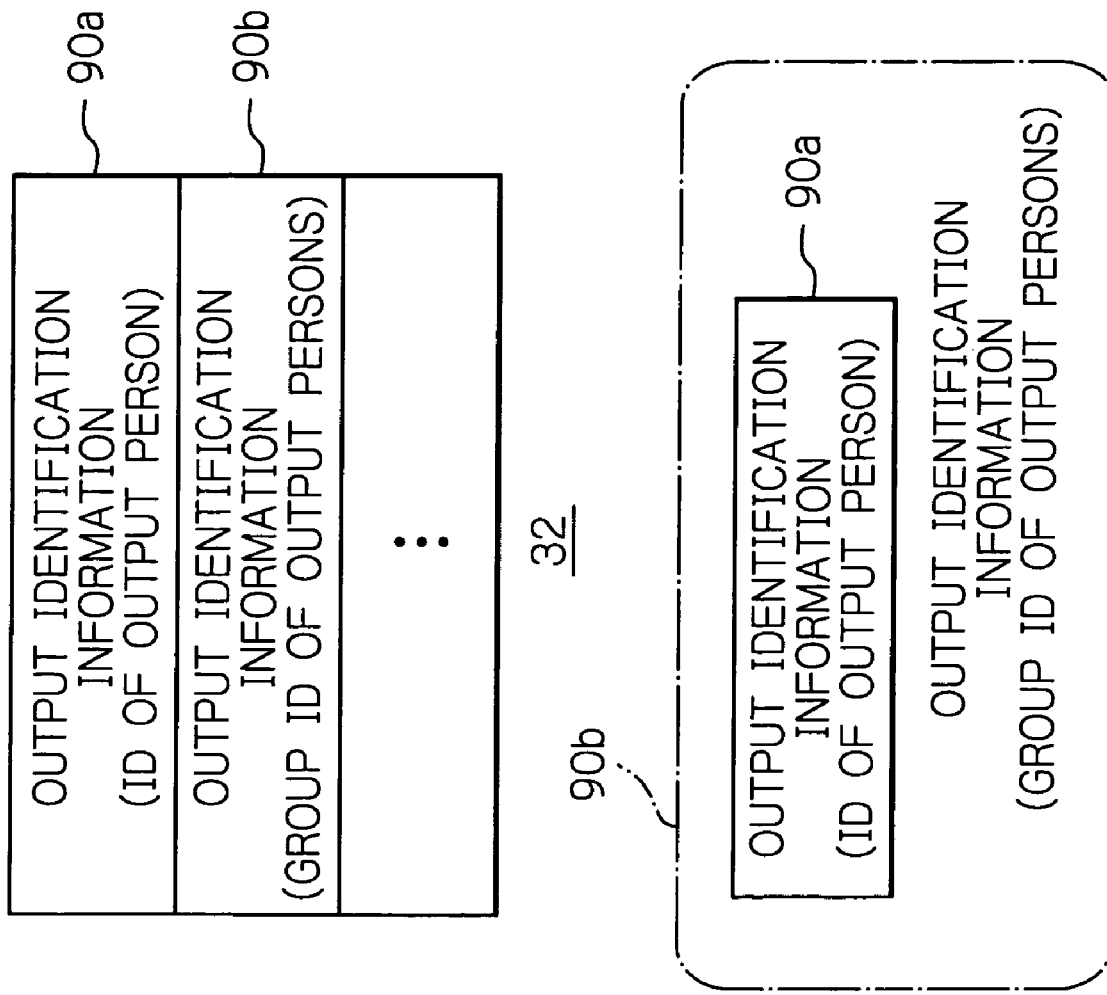

The identification information 32 of the present alternative embodiment includes one or more pieces of identification information or one or more pieces of output identification information 90a, 90b, . . . , as shown in FIG. 13A. The output identification information is the ID information for identifying an output person or a group of output persons the output person belongs to. The output identification information 90a is the ID information for identifying an output person, whereas the output identification information 90b is the output group ID information for identifying an output group the output person belongs to. The output group is composed of plural users including the output person. Thus, if the output group is identified, the source of the outputting of the printed text 16a may be specified on the group basis to allow for management of the copying of the printed text 16a.

The output identification information 90b is an output group ID, and includes IDs for output persons of the output identification information 90a, as shown in FIG. 13B. If the list information 32 includes the output identification information 90a, it is then unnecessary that the output identification information 90a is included in the list information 32. If the ID of the output identification information 90a is expressed in, for example, a two-byte digit string, the watermarked information, as the specific code, is usually the information containing two bytes.

The identification information of the previous embodiment, handled by the list information acquirer 42, is the ID information for identifying the copying person authorized for printing or the group of copying persons authorized for printing. On the other hand, the list information acquirer 42 in the copying device 14 of the present alternative embodiment handles the ID information for identifying the output person or the output group of output persons. The list information acquirers 42 in both embodiments are the same, despite the difference in the information contents.

The correlation memory 86 has the function of correlating the output identification information 90a, 90b, . . . contained in the list information 32 supplied, with the copier identification information 54 supplied, to hold the information on memory. Of course, the correlating processing by the correlation memory 86 is carried out under the control of a controller, not shown. The correlation memory 86 accepts an input of an output person ID identifying an output person from the user to output an output person ID 92 coincident with the accepted output person ID 92 on the output unit 88.

The output unit 88 has the function of acquiring the output person ID from the output person ID 92 supplied to output the so acquired outputting ID to a viewing screen or to a printing medium. The output unit 88 may be a television (TV) monitor, a liquid crystal display monitor or a printer, although not in a limiting way. The output unit 88 may also be a telecommunications interface of the Ethernet (trademark) configured for transmitting information acquired from the correlation memory 86 to an external utility device, not shown.

The copying person sets the printed text 16a to be copied, on the input unit 38 of the copying device 14 of the present alternative embodiment, and enters the copier identification information 52, identifying the copying person, recorded on a copy card, on the information unit 46.

The input unit 38 of the copying device 14 optically reads out the printed text 16a, converts the read out signals to digital image data, and generates input image 84. The input unit 38 develops the generated input image 84 to the copier 40 and to the list information acquirer 42.

The list information acquirer 42 acquires a watermarked image from the input image 84 supplied and restores the list information 32, based on the watermarked image thus acquired. The input image 84 may, for example, be a multicolor image. The list information 32 contains at least one of output identification information 90a and output identification information 90b, and is output to the correlation memory 86.

On acquisition of the list information 32, the correlation memory 86 correlates the output identification information 90a, contained in the list information 32, with the copier identification information 54, supplied from the information input unit 46, to record the so correlated information in a recording area of a magnetic disc, an optical disc, such as DVD (Digital Versatile Disc), a RAM (Random Access memory), or an EEPROM (Electrically Erasable Programmable Read-Only Memory), owned by the memory 86 per se.

If the output time information about the output time of outputting the printed text 16a or the output destination information about the output destination, such as an address of the output device 12, is embedded, in addition to the list information 32, in the watermarked image, the correlation memory 86 may also correlate the output identification information 90a with these information about the output time.

Referring to FIG. 15, the information, stored correlated in the correlation memory 86, is one or more records including the output identification information 90a, copier identification information 54, copying time information 94, output time information 96 or output destination information 98, that is, one or more cells in a transverse row of cells. Although the output identification information 90a and the copier identification information 54 are essential, other information, including the copying time information 94, output time information 96 and output destination information 98, may be dispensed with.

An example of the group of the information correlated together by the correlation memory 86, is shown in FIG. 15. That is, the "copying person ID", "05:10:05, Dec. 7, 2006", as the copying time information 94, "11:01:01, May 5, 2005", as the output time information 96 and "33.2.155.67" as the output destination information 98, are correlated together, with the "output person ID" of the output identification information 90a as key.

The copying time information 94 and the output time information 96, shown in FIG. 15, are not limited to the year-month-day-time notation, such that the information 94 or 96 may be the day-time notation. The output destination information 98, shown in FIG. 15, is not limited to the IP (Internet Protocol) address of the output device 12, but may also be the information allowing for identification, such as ID, of the site of the output device 12. Although the correlation memory 86 is adapted to correlate the plural information by recording the information on the output person ID and the copying person ID on the same record of the database, for example, the way of correlation is not limited to the case described above, provided that the data structure uniquely determines the correlation among the plural information.

After the output identification information 90a and the copier identification information 54 are recorded correlated in the correlation memory 86, the output unit 88, having a keyboard, not shown, accepts, from the keyboard, the identification information which allows for identification of the output person. The output unit 88 then transmits a retrieval request signal, not shown, to the correlation memory 86, to retrieve the output identification information 90a coincident with the identification information of the output person ID accepted. The output unit 88 of the copying device 14 may not be provided with the input means, in which case the information input unit 46 may be designed to accept the identification information of the output person.

When the correlation memory 86 has accepted the retrieval request signal and retrieved the output identification information 90a coincident with the identification information contained in the retrieval request signal, the correlation memory 86 outputs an output signal 92 to the output unit 88 as a response signal containing the relevant output identification information 90a and the copier identification information 54 correlated with the output identification information 90a. Of course, the retrieval by the correlation memory 86 is carried out under control by a controller, not shown.

The output unit 88 outputs the response signal 92, containing plural information indicating the act of copying correlated with the output person ID received, to a display screen or a printing medium, for instance, only by way of illustration. That is, when transmitting the response signal 92 to the telecommunications network, such as Ethernet (trademark), the output unit 88 may record the information on the USB (Universal Serial Bus) type of memory medium carried on a memory card or output the information contents as voice over a loudspeaker.

When the output unit 88 has accepted the identification information for the manager, registered in advance, that is, a manager ID, the correlation memory 86 may acquire the output identification information 90*a* in its entirety and the information correlated with this output identification information 90*a* to output the so acquired information to the output unit 88.

The copier 40 may be in operation substantially at the same time as the list information 32 and the correlation memory 86 to output the input image 84 as the copy 58. It is therefore possible to start the copying operation, at the same time as it accepts the input image 84, supplied thereto, thus preventing delay in the copying time and enabling proceeding to acquire a watermarked image for prohibiting unauthorized copying, for instance. With the copying unit 14 of the previous embodiment, the copying can be started only after the allowance for copying is issued and supplied to the copier 40 from the copying determiner 44.

With the above system, when the printed text 16*a* is copied, using the copying device 14, the output identification information 90*a* embedded in the printed text 16*a*, that is, the output person ID and the copier identification information 54, are recorded correlated. Hence, it is possible for the output person or the manager in charge of the copying to periodically grasp either the state of distribution of the printed text 16*a* or the state of copying.

As a principle, the copying device 14 does not inhibit copying of the printed text 16*a* and hence is able to carry out the copying smoothly promptly. However, as means for preventing the inconveniences that would be brought about by this non-inhibition of the copying, the copying device 14 may record a sequence of operations concerning the state of distribution or copying of the printed text 16*a*, described above, and provide the output person with this sequence of operations. By so doing, it becomes possible to suppress unauthorized copying or information leakage to the minimum extent possible.

Another alternative embodiment of the copy management system 10 will now be described only briefly. The correlation memory 86 of the copying device 14 of the other alternative embodiment may be basically the same as the previous alternative embodiment. However, the memory includes a notification destination lookup table 100, shown in FIG. 16, and has the function of supplying the copier 40 with the control signal 102 responsive to coincidence/non-coincidence as indicated by the results of information retrieval.

Figure 12:
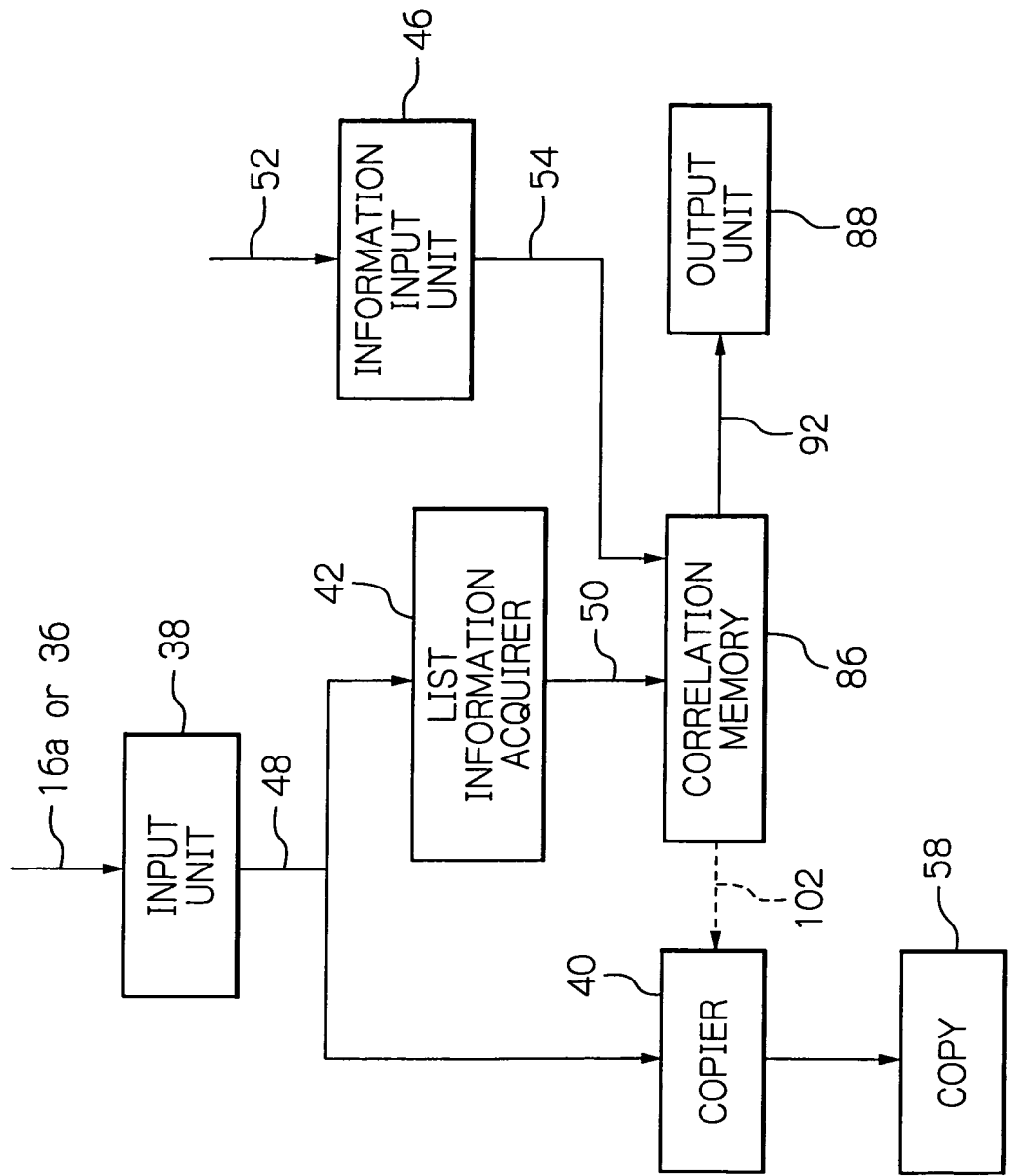
FIG. 12 is a schematic block diagram showing an alternative embodiment of a copying device in accordance with the present invention.

The correlation memory 86 in the copying device 14 is adapted, as shown in FIG. 12, to correlate the output identification information 90*a*, contained in the list information 32 supplied, with the copier identification information 54 supplied, to store the so correlated information therein. Then, based on the identification information, indicating the output person ID, the correlation memory 86 notifies the output person or the manager of the correlated stored information at the output unit 88.

The information notified by the correlation memory 86 to the output person may include at least the output identification information 90*a*, specifying the output person, and the copier identification information 54. Additionally, the above information may contain at least one of the aforementioned printing time information, printing site information and the copying time information.

The method for deciding on the destination of notification by the correlation memory 86 is not limited to that described above. For example, if the output person ID, as the output identification information 90*a*, is an email address, then the email address is used as the destination of notification. If the output person ID, as the output identification information 90*a*, is an identification number other than the email address, the destination of notification is determined from the notification destination lookup table 100, using the output person ID as key.

The notification destination lookup table 100, FIG. 16, of the present alternative embodiment includes the output identification information 104 (output person ID1, output person ID2, . . . ), and the destination of notification 106 for the output identification information (ccc@bb.ne.jp, fff@bbb.ne.jp, . . . ), shown in the figure. Thus, subject to designation of the output identification information 106 of the "output person ID1", it is possible to acquire the destination of notification 106 for the output identification information 104, namely "ccc@bb.ne.jp".

The case has been described above where there is only one notification destination 106 for the output identification information 104, as shown in FIG. 16. However, the present invention is not limited to this specific case, but may, of course, be applied to a case where there are a plural number of destinations of notification 106 for the output identification information 104. In the latter case, the correlated information, such as the output identification information 90*a* or the copier identification information 54, is separately transmitted to each of the destination of notifications 106.

In the above example, the case has been described in which the destination of notification 106, shown in FIG. 16, is an email address, such as "ccc@bb.ne.jp", "fff@bbb.ne.jp". This is merely illustrative and the destination of notification may also be a facsimile (FAX) number.

The destination lookup table 100 may also be recorded in a storage area provided in the correlation memory 86, or in a storage area of an external server, in a manner not shown. If the destination lookup table 100 is stored in a storage area, such as of an external server, the correlation memory 86 inquires of this external server as to the destination of notification 106 corresponding to the identification information to decide on the destination of notification.

When the destination of notification 106 has been determined, the correlation memory 86 appends the header information of the email address to the output identification information 90*a*, copier identification information 54, copying time information 94, output time information 96 and output destination information 98, correlated together, to formulate an email. Moreover, the correlation memory 86 converts the email in keeping with the SMTP (Simple Mail Transfer Protocol) and transmits the so converted email via the output unit 88 to the destination of notification 106.

Thus, when the printed text 16*a* is copied, at least one of the output person and the manager is instantly advised of the output identification information 90*a* and the copier identification information 54, correlated in connection with the copying. Thus, although the copying of the printed text 16*a* is allowed, the output person or the manager may promptly detect unauthorized copying if such unauthorized copying is done, thus preventing information leakage to the minimum based on the thus notified copier identification information 54.

The above-described sequence of operating steps may be executed by dedicated hardware or processed by software. In case the sequence of the operating steps is carried out by software, the software in the form of program sequences is installed on an information processing device of a generalpurpose computer or a micro-computer, with the information processing device operating as output device 12 and/or as copying device 14.

The program sequences may temporarily or permanently be stored or recorded not only on a hard disc but also on a removable recording medium, such as a flexible disc, a CD-ROM (Compact Disc Read-Only Memory), an MO (Magneto-Optical) disc, a DVD (Digital Versatile Disc), a magnetic disc or a semiconductor memory. These removable recording media may be made available as in the form of so-called package software.

Meanwhile, the program sequences may not only be installed from a removable recording medium to a computer, but also be wirelessly transferred from a download site via an artificial satellite for digital satellite broadcast, or transferred over a wired path, such as LAN (Local Area Network) or the Internet, to the computer.

The processing steps, forming a program sequence for having a computer process a variety of instructions, need not necessarily be processed in time axial in accordance with the sequence defined by a flowchart. For example, the above processing steps may be carried out in parallel or batch, such as object-oriented processing. The program sequences may be processed by a sole computer or a distributed-computer system.

While the present invention has been described with reference to the particular illustrative embodiments, shown in and described with reference to the accompanying drawings, it is not to be restricted by the embodiments. It is to be appreciated that those skilled in the art can change or modify the embodiments without departing from the technical scope and spirit of the present invention. These variations may naturally be comprised within the technical scope of the invention.

In the above-described embodiments, the identification information is information that allows for at least one of identification of the person(s) authorized for copying and the group(s) of persons authorized for copying, or at least one of the information that allows for identification of the output person(s) and the output groups outputting to outside. However, the identification information may also include both the information that allows for identification of the person(s) authorized for copying and/or the group(s) of persons authorized for copying (first identification information) and the information that allows for identification of an output person(s) and/or the group(s) of output persons (second identification information). In the latter case, both of the first and second identification information are embedded in the code-embedded print image 34.

In the above-described embodiments, the identification information is the ID. Alternatively, the identification information may also be the number of a company member or a copy card, the full name, or mail or email address of a user, or may be in the form of bar code, including a two-dimensional bar code. The identification information may also be biometric information generated based on the fingerprint or iris pattern of a user.

The output device 12 may be provided with the embedding circuit 22 and with the list information generator 20. The printer 24 may be provided in a separate external printing device. In the above described embodiments, the printer 24 is adapted to print an image embedded in the printing medium 16. However, the printer 24 may be adapted to embed an image 94 in an electronic document of the PDF format.

The entire disclosure of Japanese patent application No. 2007-019728, filed on Jan. 30, 2007, including the specification, claims, accompanying drawings and abstract of the disclosure is incorporated herein by reference in its entirety.

What is claimed is:

1. A copy management system including a copying device and an output device, said output device outputting a print image having information embedded therein to control said copying device for copying,
said output device including:
an information generator for generating list information having a plurality of pieces of identification information identifying a plurality of persons authorized to copy the information-embedded print image on said copying device or a group of persons authorized to copy the information-embedded print image on said copying device;
a first image generator for generating an original print image based on original information containing at least one of a letter, a character, a figure, a symbol and a mark, and a combination of at least two of the letter, character, figure, symbol and mark;
a second image generator for encoding the list information to convert the list information to a specific code and for embedding the specific code in the original print image to generate a code-embedded print image corresponding to the information-embedded print image; and
a printer for outputting the code-embedded print image;
said copying device including:
an information input unit for receiving and accepting at least one of information about a person doing a copying operation on said copying device and information about a group to which the person doing the copying operation belongs, as copying identification information that identifies information indicating allowance for copying;
an input unit for receiving the code-embedded print image to generate an input image;
an information acquirer for acquiring the specific code embedded in the code-embedded print image from the input image and for decoding the specific code to acquire the list information from the specific code decoded;
a copying determiner for comparing the plurality of pieces of identification information, included in the acquired list information, with the copying identification information, and determining allowance/non-allowance in accordance with a result of the comparison; and
a copier, responsive to the allowance for copying from said copying determiner, for copying the code-embedded print image.

2. The system in accordance with claim 1, wherein said copying determiner decides, from comparison of the identification information with the copying identification information, allowance for copying in response to the copying identification information according with all of the pieces of identification information, and non-allowance for copying in response to the copying identification information disaccording with the identification information.

3. The system in accordance with claim 1, wherein said information generator forms as the list information the plurality of pieces of identification information identifying the persons authorized to copy the information-embedded print image on the copy device and the group of persons authorized to copy the information-embedded print image.

4. A copying device for controlling copying based on information embedded in an information-embedded print image output from an output device, said copying device comprising:

an information input unit for accepting, as copying identification information specifying allowance for copying, at least one of information about a person doing a copying operation on said copying device and information about a group to which the person doing the copying operation belongs;

an input unit for receiving a code-embedded print image output from the output device to generate an input image;

an information acquirer for acquiring a specific code embedded in the code-embedded print image from the input image and for decoding the specific code to acquire the list information including a plurality of pieces of identification information identifying a plurality of persons authorized for copying to copy the information-embedded print image on the copying device or a group of persons authorized to copy the information-embedded print image on the copying device;

a copying determiner for comparing the plurality of pieces of identification information, included in the acquired list information, with the copying identification information, and determining allowance/non-allowance in accordance with a result of the comparison; and a copier for copying the code-embedded print image, responsive to the allowance for copying from said copying determiner.

5. The copying device in accordance with claim 4, wherein the specific code is a watermarked image.

6. The copying device in accordance with claim 4, wherein the specific code is information represented by arraying a dot pattern, said dot pattern being composed of a plurality of dots arrayed in a predetermined direction at a predetermined interval, and having an amplitude corresponding to a luminance value of the dots and a propagation direction substantially perpendicular to the predetermined direction, said dot patterns being provided in plural with at least one of the direction and the interval of the dots of said dot patterns different to thereby represent the specific code by said dot patterns in combination.

7. A non-transitory computer-readable medium having a computer program embedded therein, that, when executed by a computer, instructs the computer to operate as a copying device for controlling copying based on information embedded in a print image output from an output device, said copying device comprising:

an information input unit for accepting, as copying identification information specifying allowance for copying, at least one of information about a person doing a copying operation on said copying device and information about a group to which the person doing the copying operation belongs;

an input unit for receiving an code-embedded print image output from the output device to generate an input image;

an information acquirer for acquiring a specific code embedded in the code-embedded print image from the input image and for decoding the specific code to acquire the list information including a plurality of pieces of identification information identifying a plurality of persons authorized for copying to copy the information-embedded print image on the copying device or a group of persons authorized to copy the information-embedded print image on the copying device;

a copying determiner for comparing the plurality of pieces of identification information, included in the acquired list information, with the copying identification information, and determining allowance/non-allowance in accordance with a result of the comparison; and a copier for copying the code-embedded print image, responsive to the allowance for copying from said copying determiner.

* * * * *